(12) United States Patent
Tao et al.

(10) Patent No.: US 10,151,638 B2
(45) Date of Patent: Dec. 11, 2018

(54) BOLOMETER, METHOD OF FABRICATING THE SAME, AND BOLOMETRIC METHOD

(71) Applicant: AGENCY FOR SCIENCE, TECHNOLOGY AND RESEARCH, Singapore (SG)

(72) Inventors: Jifang Tao, Singapore (SG); Hong Cai, Singapore (SG); Yuandong Alex Gu, Singapore (SG); Guoqiang Wu, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 0 days.

(21) Appl. No.: 15/761,082

(22) PCT Filed: Aug. 12, 2016

(86) PCT No.: PCT/SG2016/050387
§ 371 (c)(1),
(2) Date: Mar. 16, 2018

(87) PCT Pub. No.: WO2017/048189
PCT Pub. Date: Mar. 23, 2017

(65) Prior Publication Data
US 2018/0266889 A1    Sep. 20, 2018

(30) Foreign Application Priority Data
Sep. 18, 2015   (SG) .......................... 10201507787 U

(51) Int. Cl.
*G01J 5/08*     (2006.01)
*G01J 5/20*     (2006.01)
(52) U.S. Cl.
CPC .............. *G01J 5/20* (2013.01); *G01J 5/0818* (2013.01)

(58) Field of Classification Search
CPC .................................. G01J 5/0818; G01J 5/20
See application file for complete search history.

(56) References Cited

U.S. PATENT DOCUMENTS 5,369,280 A    11/1994  Liddiard
7,026,602 B2    4/2006  Dausch
(Continued)

FOREIGN PATENT DOCUMENTS

CN    103033271 A    4/2013

OTHER PUBLICATIONS

IP Office of Singapore—Notification of Transmittal of the International Search Report & the Written Opinion of the International Searching Authority, or the Declaration, with the International Search Report & Written Opinion dated Oct. 4, 2016 for International Application No. PCT/SG2016/050387 (9 pgs).
(Continued)

*Primary Examiner* — Mark R Gaworecki
(74) *Attorney, Agent, or Firm* — Womble Bond Dickinson (US) LLP

(57) ABSTRACT

Various aspects of this disclosure provide a bolometer including a substrate and a ring resonator structure over the substrate. The bolometer may also include a silicon oxide layer in thermal contact with the ring resonator structure. The bolometer may further include a first waveguide over the substrate and coupled to the ring resonator structure, the first waveguide configured to couple an infrared light to the ring resonator structure so that the infrared light generates a temperature increase in the silicon oxide layer. The bolometer may additionally include a second waveguide over the substrate and coupled to the ring resonator structure, the second waveguide configured to couple a probe light input to the ring resonator structure so that a probe light output is generated from the probe light input, the probe light output
(Continued)

having a change in a characteristic from the probe light input based on the temperature increase.

20 Claims, 18 Drawing Sheets

(56) References Cited

U.S. PATENT DOCUMENTS

| | | | |
|---|---|---|---|
| 7,057,250 B2 | 6/2006 | Kolodzey et al. | |
| 7,667,200 B1* | 2/2010 | Watts | G01J 5/08 250/338.1 |
| 7,820,970 B1* | 10/2010 | Shaw | G01J 5/08 250/338.1 |
| 7,968,846 B2 | 6/2011 | Talghader et al. | |
| 2003/0016729 A1 | 1/2003 | Lee et al. | |
| 2006/0202120 A1 | 9/2006 | Kauffman et al. | |
| 2007/0110358 A1 | 5/2007 | Hu et al. | |
| 2013/0295688 A1 | 11/2013 | Bailey et al. | |
| 2014/0054460 A1 | 2/2014 | Gidon | |
| 2014/0264030 A1 | 9/2014 | Lin et al. | |

OTHER PUBLICATIONS

IP Office of Singapore—International Preliminary Report on Patentability including Chapter II Demand dated Jul. 25, 2017, including related Article 34 Amendment filed for PCT/SG2016/050387 on May 24, 2017 (16 pgs).

Chen, et al., "Ultrasensitive gas-phase chemical sensing based on functionalized photonic crystal nanobeam cavities," ACS Nano (2014) vol. 8, No. 1, pp. 522-527.

Hodgkinson et al., "Optical gas sensing: a review," Meas. Sci. Technol. (2013) vol. 24, No. 1, pp. 1-59 w-cover (012004).

Kohin et al, "Performance limits of uncooled VOx microbolometer focal plane arrays," Proc. SPIE (2004), vol. 5406, pp. 447-453, Orlando, USA.

Lin, et al., "Chip-scale Mid-infrared chemical sensors using air-clad pedestal silicon waveguides," Lab Chip (2013) vol. 13, pp. 2161-2166.

Soref, et al., "Mid-infrared photonics in silicon and germanium," Nature Photonics (Aug. 2010) vol. 4, pp. 495-497.

Tao, et al., "Demonstration of a photonic-based linear temperature sensor," Photonics Technology Letters (Apr. 1, 2015) vol. 27, No. 7. pp. 767-769.

* cited by examiner

FIG. 4

400 couple an infrared light to a ring resonator structure via a first waveguide
402 couple a probe light input via a second waveguide to the ring resonator structure
404

US 10,151,638 B2

BOLOMETER, METHOD OF FABRICATING THE SAME, AND BOLOMETRIC METHOD

CROSS-REFERENCE TO RELATED APPLICATIONS

This patent application is a U.S. National Phase application under 35 U.S.C. § 371 of International Application No. PCT/SG2016/050387, filed on 12 Aug. 2016, entitled BOLOMETER, METHOD OF FABRICATING THE SAME, AND BOLOMETRIC METHOD, which claims the benefit of priority of Singapore Patent Application No. 10201507787U, filed 18 Sep. 2015, the contents of which was incorporated by reference in the entirety for all purposes.

TECHNICAL FIELD

Various aspects of this disclosure relate to bolometers, methods of fabricating the same, and/or bolometric methods.

BACKGROUND

Bolometric detectors, also named as bolometers, are thermal infrared sensors that absorb electromagnetic radiation, which causes an increase in temperature. The resulting temperature increase is a function of the radiant energy striking the bolometer and may be measured with thermoelectric, pyroelectric, resistive components. Accordingly, bolometers are able to detect or measure electromagnetic radiation.

FIG. 1A shows a conventional bolometer 100a employing a sensing resistor 102. FIG. 1A shows an infrared (IR) absorbing layer 104, the sensing resistor 102 in thermal connection with layer 104, a thermostat 106, and a link 108 connecting the sensing resistor 102 with the thermostat.

FIG. 1B shows another conventional bolometer 100b, which relies on changes in resistance to measure electromagnetic radiation. FIG. 1B shows an absorber layer 110 for absorbing infrared (IR) radiation, a sensitive layer 112 for sensing the IR radiation, a gold (Au) layer 114 for reflecting IR radiation towards layer 112, and a silicon nitride layer 116 for encapsulating the sensitive layer 112.

The change in resistance, ΔR, is provided by $$\frac{\Delta R}{R_0} = \alpha \Delta T,$$

where $R_0$ is the initial resistance, $\Delta T$ is the change in temperature, and $\alpha$ is the temperature coefficient of resistance. The change in temperature may be provided by $$\Delta T = \frac{\eta P_0}{G_{th}\sqrt{1 + 4\pi^2 f^2 \tau^2}},$$

where $P_0$ is the power of the input light received, $\eta$ is the absorption coefficient of the bolometer, $G_{th}$ is the thermal conductance between the bolometer and surrounding thermal environment, f is the modulation frequency of the input light, and $\tau$ is the time constant of the bolometer. The time constant of the bolometer may be provided by $$\tau = \frac{C_{th}}{G_{th}},$$

where $C_{th}$ is the thermal capacity of the bolometer, and $G_{th}$ is the thermal conductance between the bolometer and surrounding thermal environment as provided earlier.

The bolometers are used in a wide variety of applications, such as in non-dispersive infrared (NDIR) gas sensing, thermography, firefighting, and security. However, most of current bolometric transducers are designed for free-space optics applications, which may result in low efficiency, and high power consumption. Also, their sensitivities may be limited by the low temperature coefficient of resistance (α), as well as low conversion of radiant energy to heat energy. Additionally, conventional bolometers may also suffer from response speed, which is often in the range of milliseconds (ms).

SUMMARY

Various aspects of this disclosure provide a bolometer. The bolometer may include a substrate. The bolometer may further include a ring resonator structure over the substrate. The bolometer may also include a silicon oxide layer in thermal contact with the ring resonator structure. The bolometer may further include a first waveguide over the substrate and coupled to the ring resonator structure, the first waveguide configured to couple an infrared light to the ring resonator structure so that the infrared light generates a temperature increase in the silicon oxide layer. The bolometer may additionally include a second waveguide over the substrate and coupled to the ring resonator structure, the second waveguide configured to couple a probe light input to the ring resonator structure so that a probe light output is generated from the probe light input, the probe light output having a change in a characteristic from the probe light input based on the temperature increase.

Various aspects of this disclosure provide a method for fabricating a bolometer according to various embodiments. The method may include providing a substrate. The method may also include providing a ring resonator structure over the substrate. The method may further include providing a silicon oxide layer in thermal contact with the ring resonator structure. The method may additionally include providing a first waveguide over the substrate and coupled to the ring resonator structure, to couple an infrared light to the ring resonator structure so that the infrared light generates a temperature increase in the silicon oxide layer. The method may also include providing a second waveguide over the substrate and coupled to the resonator structure, to couple a probe light input to the ring resonator structure so that a probe light output is generated from the probe light input, the probe light output having a change in a characteristic from the probe light input based on the temperature increase.

Various aspects of this disclosure provide a bolometric method according to various embodiments. The bolometric method may include coupling an infrared light to a ring resonator structure via a first waveguide so that the infrared light generates a temperature increase in a silicon oxide layer in thermal contact with the ring resonator structure. The bolometric method may include coupling a probe light input via a second waveguide to the ring resonator structure so that a probe light output is generated from the probe light input, the probe light output having a change in a characteristic from the probe light input based on the temperature increase.

BRIEF DESCRIPTION OF THE DRAWINGS

The invention will be better understood with reference to the detailed description when considered in conjunction with the non-limiting examples and the accompanying drawings, in which:

FIG. 4 is a schematic illustrating a bolometric method according to various embodiments.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the term "about" or "approximately" as applied to a numeric value encompasses the exact value and a reasonable variance.

As used herein, the term "and/or" includes any and all combinations of one or more of the associated listed items.

Figure 1A:
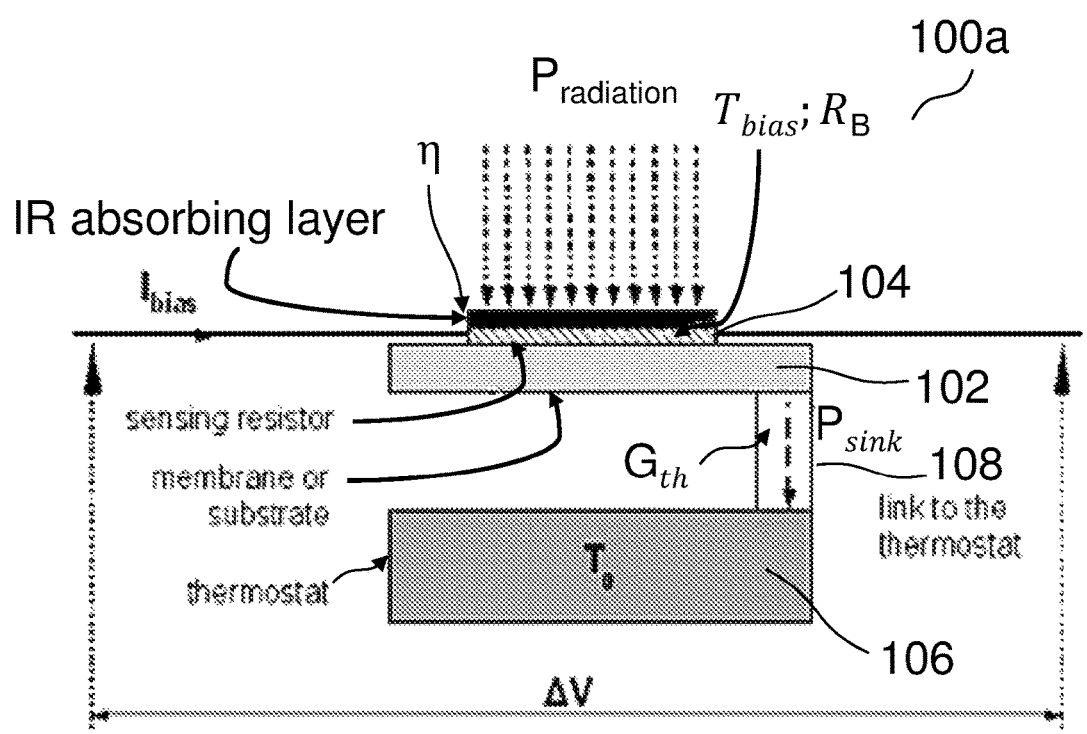
FIG. 1A shows a conventional bolometer employing a sensing resistor.
Figure 1B:
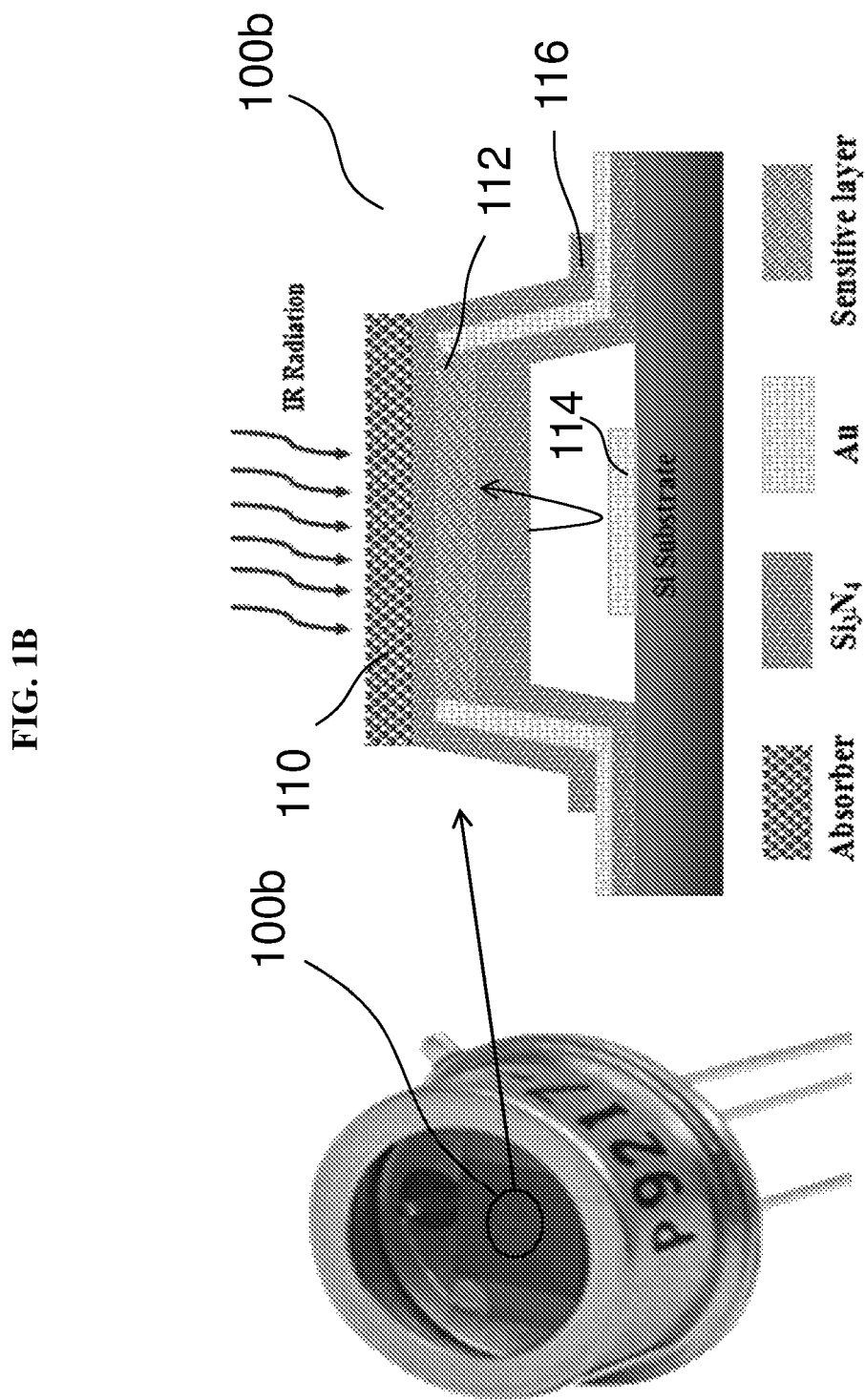
FIG. 1B shows another conventional bolometer, which relies on changes in resistance to measure electromagnetic radiation.
Figure 2:
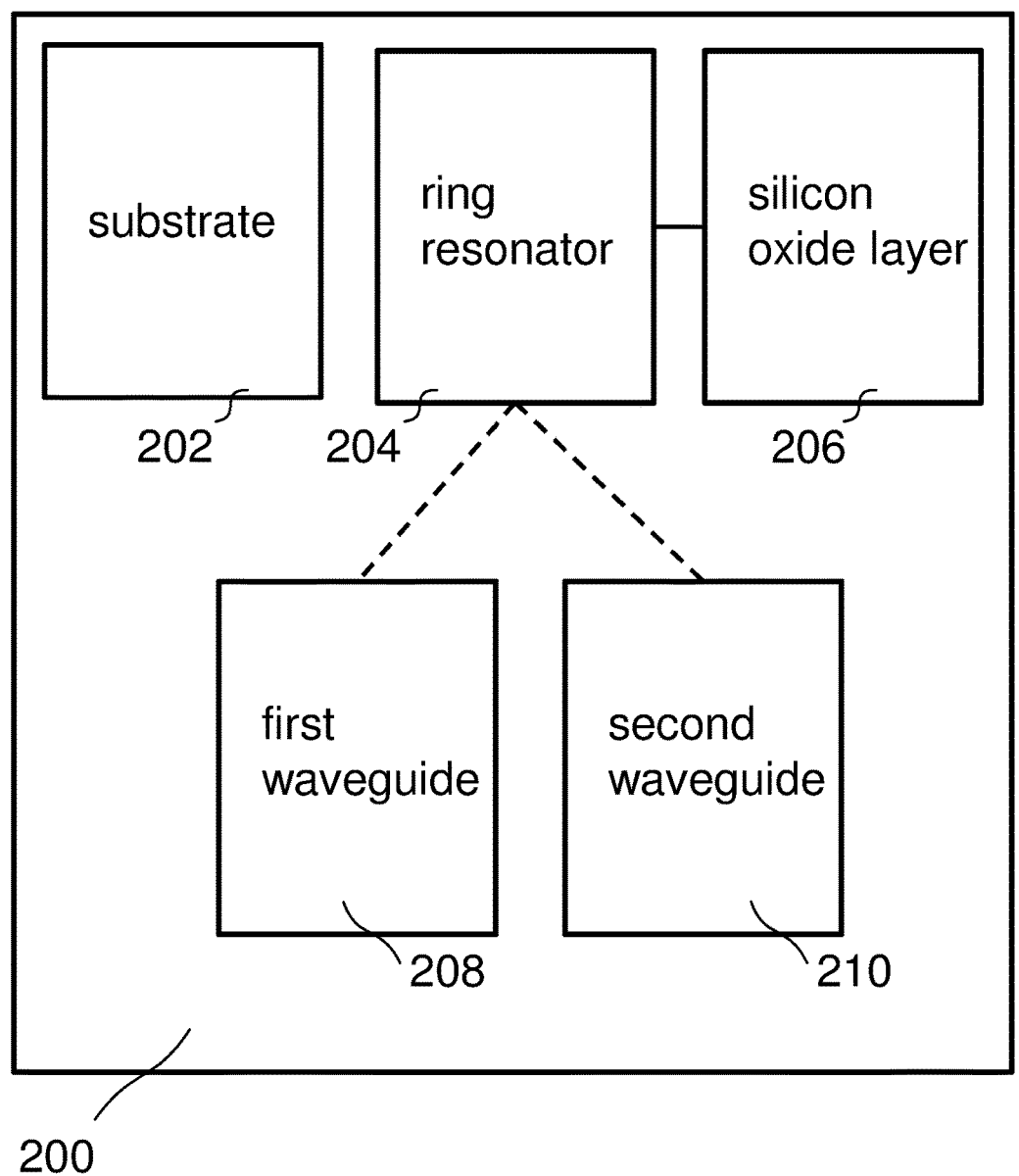
FIG. 2 is a schematic illustrating a bolometer according to various embodiments.

In various embodiments, a bolometer may be provided. FIG. 2 is a schematic illustrating a bolometer 200 according to various embodiments. The bolometer 200 may include a substrate 202. The bolometer 200 may further include a ring resonator structure 204 over the substrate 202. The bolometer 200 may also include a silicon oxide layer 206 in thermal contact with the ring resonator structure 204. The bolometer 200 may further include a first waveguide 208 over the substrate 202 and coupled to the ring resonator structure 204, the first waveguide 208 configured to couple an infrared light to the ring resonator structure 204 so that the infrared light generates a temperature increase in the silicon oxide layer 206. The bolometer 200 may additionally include a second waveguide 210 over the substrate 202 and coupled to the ring resonator structure 204, the second waveguide 210 configured to couple a probe light input to the ring resonator structure 204 so that a probe light output is generated from the probe light input, the probe light output having a change in a characteristic from the probe light input based on the temperature increase.

In other words, the bolometer 200 may include a ring resonator structure 204 in contact with a silicon oxide layer 206. The bolometer 200 also includes a first waveguide 208 and a second waveguide 210 coupled to the ring resonator structure 204. The ring resonator structure 204, silicon oxide layer 206, the first waveguide 208 and the second waveguide 210 may be over a substrate 202. The first waveguide 208 may carry an infrared light which may cause a temperature increase in the silicon oxide layer 206. The second waveguide 2010 may carry a probe light input. A probe light output may be generated based on the probe light input, with a characteristic of the probe light input changed based on the temperature increase.

Various embodiments may address or mitigate one or more issues facing conventional bolometers. Various embodiments may have higher efficiency, lower power consumption and/or faster response speed compared to conventional bolometers.

FIG. 2 provides a general schematic of a bolometer according to various embodiments and should not be interpreted in a limiting manner. For instance, FIG. 2 illustrates various features present in various embodiments, and does not necessarily denote the relative positions or arrangements of the various features. The ring resonator 204 and the silicon oxide layer 206 are linked by a solid link to represent that the ring resonator 204 and the silicon oxide layer 206 are in thermal contact with each other. The ring resonator 204 is shown in FIG. 2 to be linked to a first waveguide 208 by a first dashed line and to a second waveguide 210 by a second dashed line to represent that the ring resonator 204 is coupled to the first waveguide 208 and the second waveguide 210.

In the present context, the first waveguide 208 coupled to the resonator structure 204 may refer to the first waveguide 208 being optically coupled to the resonator structure 204. The first waveguide 208 and the resonator structure 204 may be configured to or arranged so that a light travelling along the first waveguide 208 may be coupled to the resonator structure 204. Similarly, the second waveguide 210 coupled to the resonator structure 204 may refer to the second waveguide 210 being optically coupled to the resonator structure 204. The second waveguide 210 and the resonator structure 204 may be configured to or arranged so that a light travelling along the second waveguide 210 may be coupled to the resonator structure 204. Accordingly, the first waveguide 208 coupled to the resonator structure 204 may not necessarily mean that the first waveguide 208 is in contact with the resonator structure 204. Similarly, the second waveguide 210 coupled to the resonator structure 204 may not necessarily mean that the second waveguide 210 is on contact with the resonator structure 204.

In the present context, the silicon oxide layer 206 in thermal contact with the ring resonator structure 204 may refer to the silicon oxide layer 206 is coupled or connected to the ring resonator structure 204 so that heat from the ring resonator structure 204 is able to flow to the silicon oxide layer 206. The silicon oxide layer 206 may or may not be in direct contact with the ring resonator structure 204.

In the present context, a first feature is "over" a second feature may refer to a situation in which the first feature is on the second feature, or a situation in which the first feature is separated from the second feature by one or more intervening features.

Various embodiments may be configured to detect infrared light. Various embodiments may be configured to detect infrared light in the mid-infrared region, i.e. light having a wavelength or wavelengths selected from a range of about 3 μm to about 8 μm, e.g. from a range of about 3.6 μm to about 6.8 μm. Various embodiments may be configured to detect one or more specific wavelengths of infrared light.

In various embodiments, the silicon oxide layer 206 may be provided below the ring resonator structure 204. The ring resonator structure 204 may be over the silicon oxide layer 206.

In various alternate embodiments, the silicon oxide layer 206 may be provided on top of, i.e. over, the ring resonator structure 204.

In various embodiments, the bolometer 200 may further include a cavity below at least a portion of the ring resonator structure 204. The cavity may extend to below the first waveguide 208 and/or the second waveguide 210.

The bolometer 200 may further include a pedestal and a plurality of spokes. The pedestal and the plurality of spokes may be configured to hold the ring resonator structure 204. The plurality of spokes may extend from the pedestal, which may be positioned or arranged at a center of the ring resonator structure 204. A first pair of spokes may extend along a first diameter of the ring resonator structure 204 through the center of the ring resonator structure 204. A second pair of spokes may extend along a second diameter of the ring resonator structure 204 through the center of the ring resonator structure 204.

In various embodiments, the change in characteristic may include a change in wavelength.

In various embodiments, the probe light may be an infrared light. In various embodiments, the probe light may be in the near infra-red region. In various embodiments, the probe light may include a wavelength of at least substantially 1.55 μm.

In various embodiments, the ring resonator structure 204 may have a specific resonant wavelength or range of resonant wavelengths. The ring resonator 204 may be configured to detect a specific wavelengths or range of wavelengths of infrared light. In various embodiments, the ring resonator structure 204 may be configured to change its resonant wavelength or range of resonant wavelengths upon a temperature change.

In various embodiments, the bolometer 200 may include at least one further ring resonator structure, wherein the ring resonator structure 204 and the at least one further ring resonator structure have pairwise different resonant wavelengths or range of resonant wavelengths. The at least one further ring resonator structure may have a size/radius different from the ring resonator structure 204. Accordingly, the bolometer 200 may be configured to detect two or more different wavelengths or ranges of wavelengths of infrared light. Each of the at least one further resonator structure may be configured to detect a specific wavelength or range of wavelengths of infrared light.

The first waveguide 208 may be coupled to the at least one further ring resonator structure. The second waveguide 210 may be coupled to the at least one further ring resonator structure. As described above, the first waveguide 208 coupled to the at least one further ring resonator structure may mean that the first waveguide 208 is optically coupled to the at least one further ring resonator structure, and may not necessarily mean that the first waveguide 208 is in contact with the at least one further ring resonator. Similarly, the second waveguide 210 coupled to the at least one further ring resonator structure may mean that the second waveguide 210 is optically coupled to the at least one further ring resonator structure, and may not necessarily mean that the second waveguide 210 is in contact with the at least one further ring resonator.

The at least one further ring resonator may have similar features as the ring resonator structure 204. The bolometer 200 may include a further silicon oxide layer in thermal contact with each of the at least one further ring resonator. In other words, each of the at least one further ring resonator may be connected or coupled to a respective further silicon oxide layer so that heat from each of the at least one further ring resonator may flow to the respective further silicon oxide layer.

The ring resonator structure 204 and/or at least one further ring resonator structure may include a silicon layer. The ring resonator structure 204 and/or at least one further ring resonator structure may include a protection layer on the silicon layer. The protection layer may include an aluminum oxide ($Al_2O_3$) layer.

The bolometer 200 may be referred to as a bolometric transducer or a nano-optomechanical systems (NOMS) bolometric transducer. NOMS is a type of energy transduction device. NOMS may result from the convergence of nanoelectromechanical systems (NEMS) and nanophotonics. The convergence of NEMS and nanophotonics is described in Tang, Hong. "Nano-Optomechanical Systems", Integrated Photonics Research, Silicon and Nanophotonics. Optical Society of America, 2011, which is incorporated herein for reference.

The first waveguide 208 and/or the second waveguide 210 may be nano-waveguides.

Figure 3:
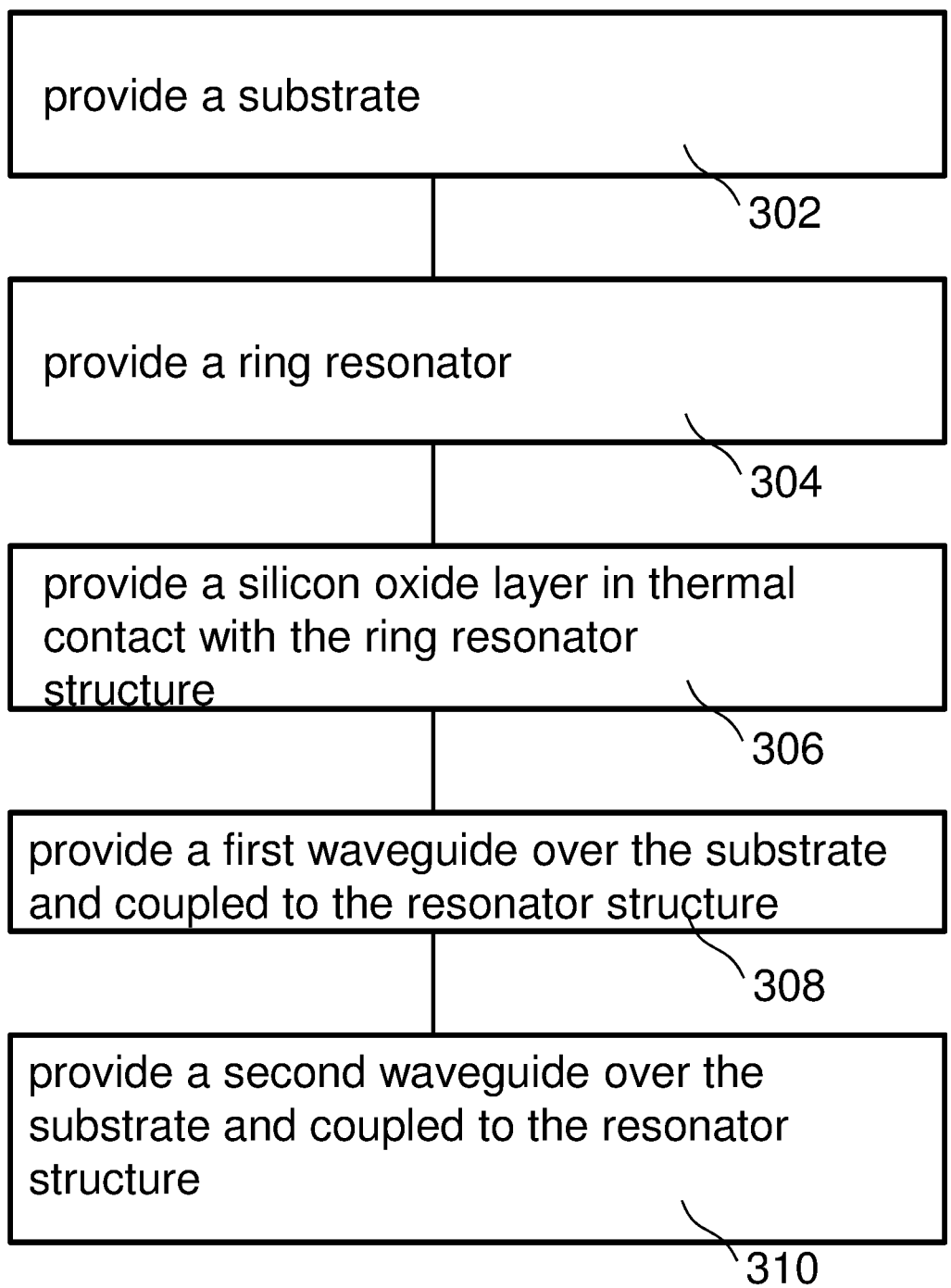
FIG. 3 is a schematic illustrating a method for fabricating a bolometer according to various embodiments.

FIG. 3 is a schematic 300 illustrating a method for fabricating a bolometer according to various embodiments. The method may include, in 302, providing a substrate. The method may also include, in 304, providing a ring resonator structure over the substrate. The method may further include, in 306, providing a silicon oxide layer in thermal contact with the ring resonator structure. The method may additionally include, in 308, providing a first waveguide over the substrate and coupled to the ring resonator, to couple an infrared light to the ring resonator structure so that the infrared light generates a temperature increase in the silicon oxide layer. The method may also include, in 310, providing a second waveguide over the substrate and coupled to the ring resonator structure, to couple a probe light input to the ring resonator structure so that a probe light output is generated from the probe light input, the probe light output having a change in a characteristic from the probe light input based on the temperature increase.

In other words, a bolometer may be formed by providing a ring resonator structure over a substrate, thermally contacting the ring resonator structure with a silicon oxide layer, and coupling the ring resonator structure with a first waveguide and a second waveguide.

In various embodiments, the ring resonator structure may be formed over the substrate. The silicon oxide layer may be formed over the substrate. The silicon oxide layer may be formed below or on top of the ring resonator structure.

The first waveguide and/or the second waveguide may be formed over the substrate.

In various embodiments, providing the ring resonator structure may include etching a silicon layer provided on the substrate.

In various embodiments, providing the first waveguide may include etching the silicon layer provided on the substrate.

In various embodiments, providing the second waveguide may include etching the silicon layer provided on the substrate.

The method may further include providing a cavity below at least a portion of the ring resonator structure. Providing the cavity may include etching by using xenon difluoride ($XeF_2$).

FIG. 4 is a schematic 400 illustrating a bolometric method according to various embodiments. The bolometric method may include, in 402, coupling an infrared light to a ring resonator structure via a first waveguide so that the infrared light generates a temperature increase in a silicon oxide layer in thermal contact with the ring resonator structure. The bolometric method may include, in 404, coupling a probe light input via a second waveguide to the ring resonator structure so that a probe light output is generated from the probe light input, the probe light output having a change in a characteristic from the probe light input based on the temperature increase.

In other words, the method include providing an infrared light to the ring resonator structure through the first waveguide so that the infrared light heats up a silicon oxide layer which is in thermal contact with the ring resonator structure, thereby causing an increase in temperature of the silicon oxide layer. The method may further include providing a probe light input through the second waveguide. The characteristic of the probe light may change due to the increase in temperature of the silicon oxide layer to produce a probe light output.

The bolometric method may further include determining an energy of the infrared light based on the change in the characteristic.

The infrared light may be at the resonant frequency of the ring resonator.

The silicon oxide layer may be transparent to the probe light input. The probe light input may pass substantially through the silicon oxide layer. The probe light input may not substantially be absorbed by the silicon oxide layer. The probe light input may not cause any appreciable or substantial increase in temperature of the silicon oxide layer.

The infrared light may be further coupled to one or more further ring resonator structures via the first waveguide. The infrared light may generate a temperature increase in a respective further silicon oxide layer in thermal contact with each of the one or more further ring resonator structures.

The probe light input may be further coupled via the second waveguide to the one or more further ring resonator structures. The probe light input may not cause any appreciable or substantial increase in temperature of the silicon oxide layer or the temperature of the further silicon oxide layer(s).

The probe input may be a broadband light or may include a plurality of wavelengths. The temperature increase in each of the silicon oxide layer and the further silicon oxide layers may cause a change in a characteristic from a respective wavelength of the plurality of wavelengths of the probe light input based on the temperature increase.

The change in characteristic may include a change in the wavelength or respective wavelength.

Figure 5:
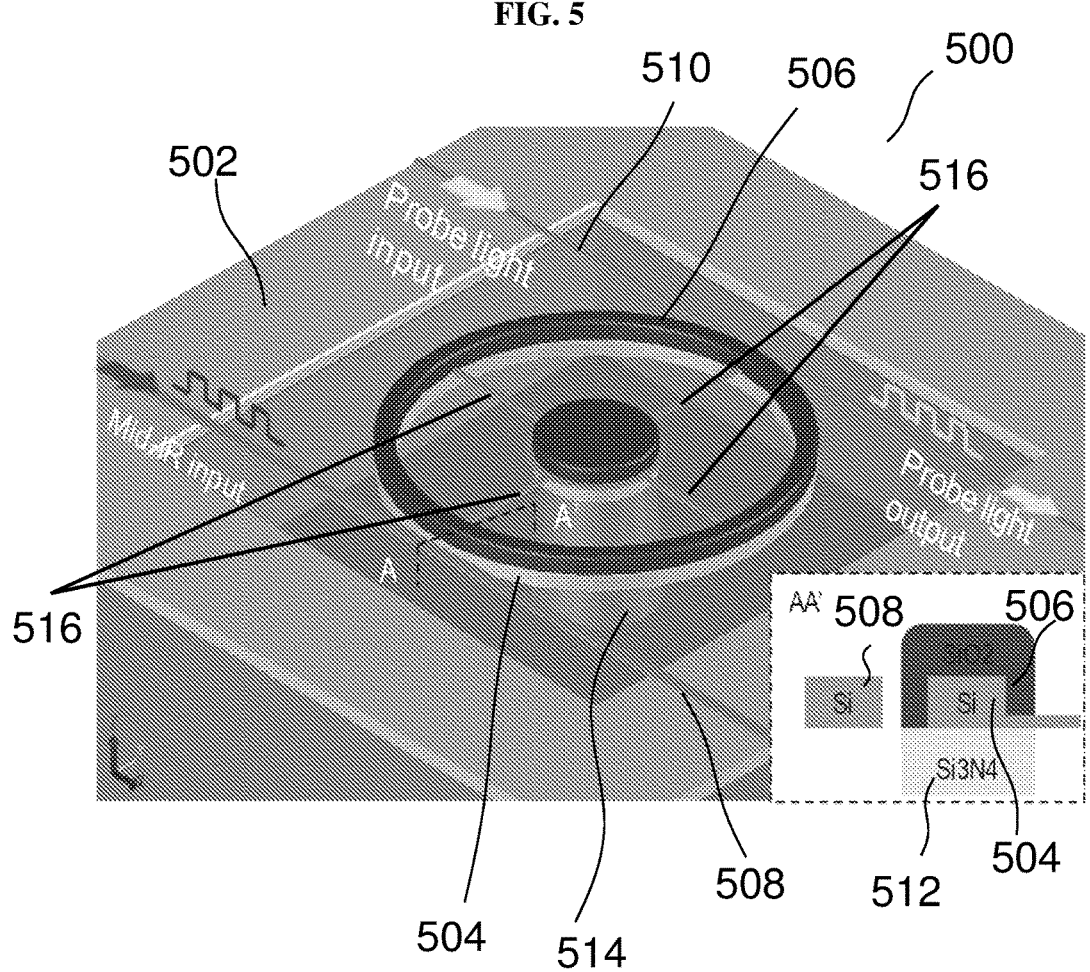
FIG. 5 is a schematic showing a bolometer according to various embodiments.

FIG. 5 is a schematic showing a bolometer 500 according to various embodiments. The inset of FIG. 5 shows a cross-sectional schematic of the bolometer 500 across A-A'. The bolometer 500 may include a ring resonator structure 504 over a substrate 502. The ring resonator structure 504 may alternatively be referred to as a resonator ring cavity. The ring resonator structure 504 may include a semiconductor such as silicon. The bolometer 500 may further include an insulation layer 512 between the ring resonator structure 504 and the substrate 502. The insulation layer 512 may include silicon nitride ($Si_3N_4$).

The substrate 502 may be formed from a silicon-on-insulator (SOI) wafer. The ring resonator structure 504 may be held by a pedestal 514 and a plurality of spokes 516. The pedestal 514 may extend vertically from the substrate 502. The pedestal 514 may be substantially perpendicular to a main surface of the substrate 502. The plurality of spokes 516 may extend from an end region of the pedestal 514 distal from the substrate 502. The plurality of spokes 516 may be substantially parallel to the main surface of the substrate 502. As shown in FIG. 5, the plurality of spokes may include a first pair extending in a line along a diameter of the ring resonator structure 504 through a geometric center of the ring resonator structure connecting one point of the ring resonator structure 504 with an opposing point of the ring resonator structure 504. The plurality of spokes may include a second pair extending in a line along a diameter of the ring resonator structure 504 (and substantially perpendicular to the first pair) through the geometric center of the ring resonator structure connecting one point of the ring resonator structure 504 with an opposing point of the ring resonator structure 504.

The bolometer 500 may further include an absorption layer 506 including silicon oxide on the ring resonator structure 504. As shown in the inset of FIG. 5, the ring resonator structure 504 may be encapsulated or covered by the silicon oxide layer 506 and the insulation layer 512.

The bolometer 500 may further include two double-clamped waveguides 508, 510. The first waveguide 508 may be configured to couple mid-infrared light to the ring resonator structure 504, and the second waveguide 510 may be configured to couple probe light input to the ring resonator structure 504.

Figure 6:
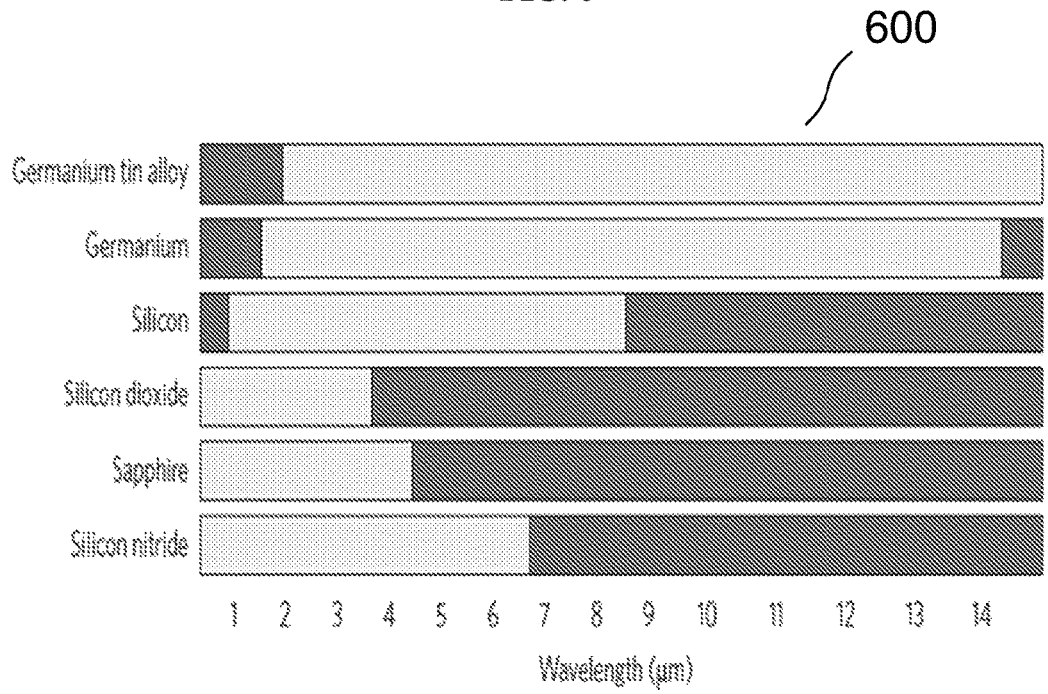
FIG. 6 is a schematic illustrating the infrared wavelength range over which light propagation loss is less than 2 dB/cm.

FIG. 6 is a schematic 600 illustrating the infrared wavelength range over which light propagation loss is less than 2 dB/cm. The dark regions represent wavelengths in which the loss is equal or greater than 2 dB/cm, while the light regions represent wavelengths in which the loss is less than 2 dB/cm, indicating that the relevant material is optically transparent to these wavelengths. As shown in FIG. 6, $Si_3N_4$ material has much weaker light absorption characteristics than $SiO_2$ material within the spectral window between about 3.6 μm to about 6.8 μm. Accordingly, $SiO_2$ is used as an absorption layer to effectively convert mid-infrared light to heat, while $Si_3N_4$ is used as an insulation layer 512. The insulation layer 512 may instead be replaced by a gap for improving thermal isolation. $Si_3N_4$ may be used as a sacrificial layer during fabrication, and may be etched or removed before the completion of the fabrication of the bolometer 500.

In order to detect temperature variation of the silicon oxide layer 506 with high sensitivity and fast, a probe light (e.g. with wavelength (λ)=1.55 μm, which is transparent in silicon oxide material as shown in FIG. 6) may be provided to the ring resonator structure 504. Due to the strong thermo-optics effect of the silicon waveguide, a small temperature variation may generate an obvious resonant wavelength shift.

Figure 7:
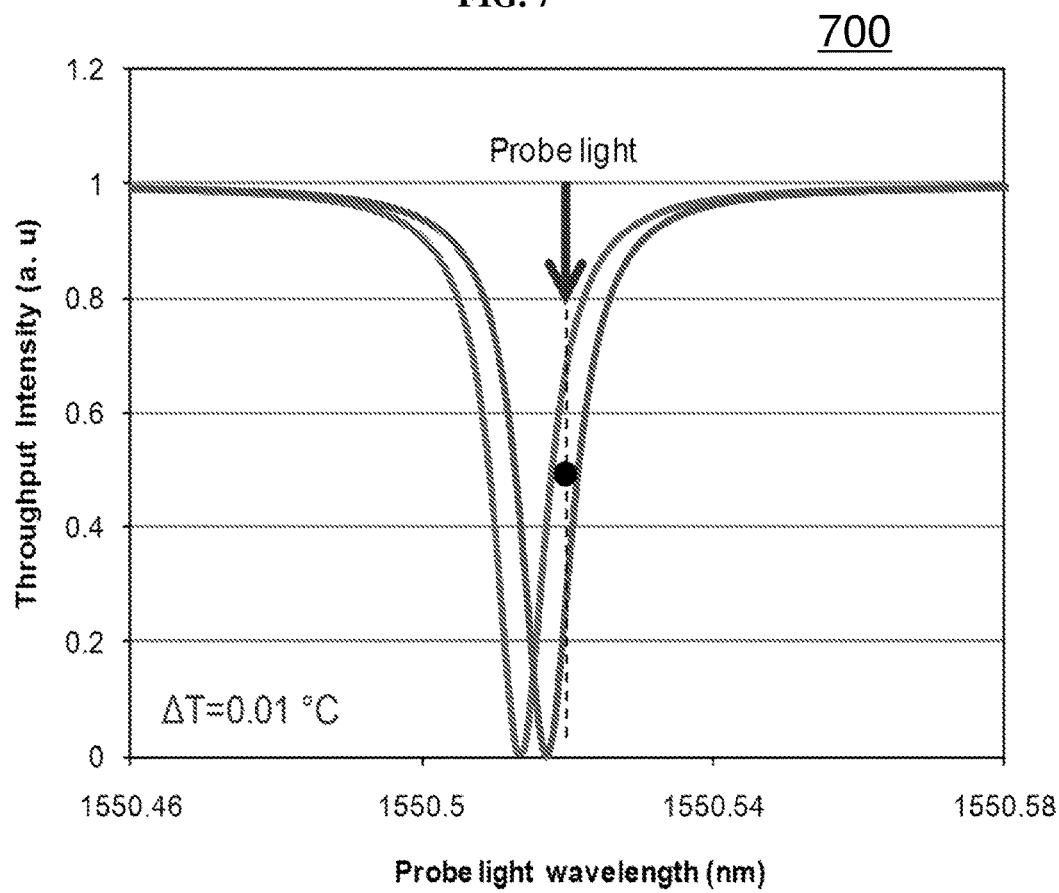
FIG. 7 is a plot of throughput intensity (arbitrary units or a.u.) as a function of probe light wavelength (nanometers or nm) showing the transmission spectra of the probe light output according to various embodiments.

FIG. 7 is a plot 700 of throughput intensity (arbitrary units or a.u.) as a function of probe light wavelength (nanometers or nm) showing the transmission spectra of the probe light output according to various embodiments. The probe light input is indicated by the arrow. FIG. 7 shows that a change of 0.01° C. in temperature may lead to an obvious resonant wavelength shift.

Various embodiments may be more sensitive than the existing IR sensors.

Figure 8A:
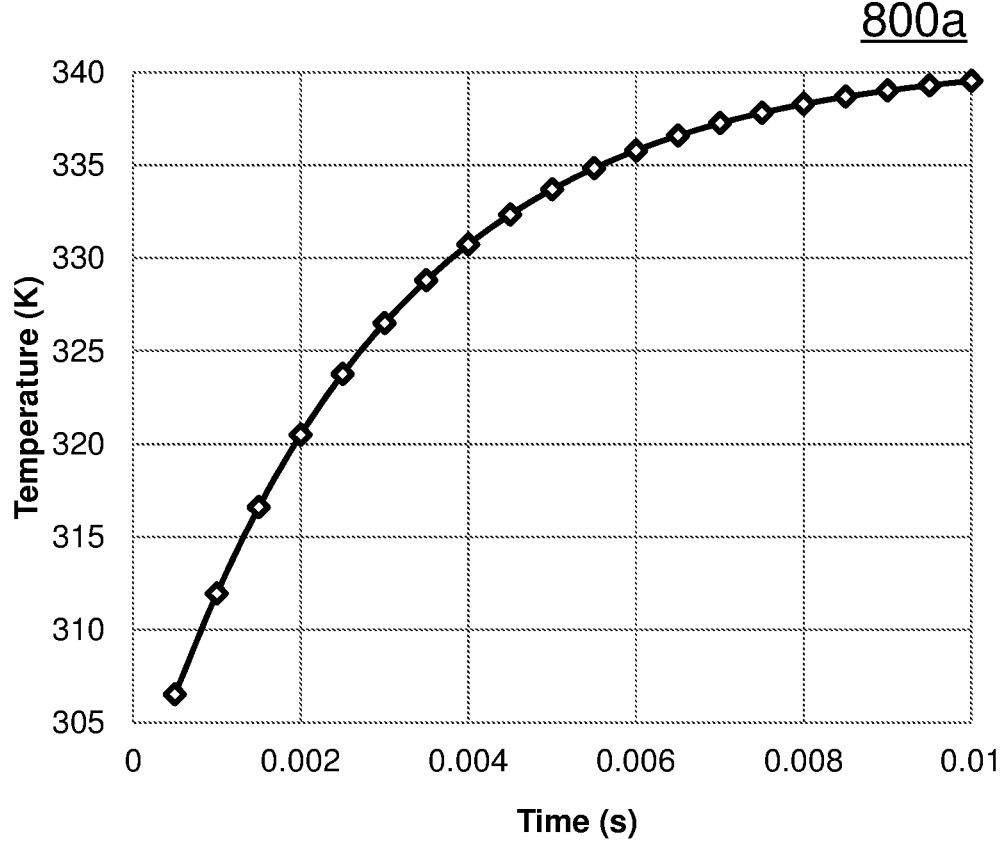
FIG. 8A is a plot of temperature (kelvins or K) as a function of time (seconds or s) illustrating the dynamic performance of the bolometer according to various embodiments when the input infrared light is 1 milli-watt (mW).

FIG. 8A is a plot 800a of temperature (kelvins or K) as a function of time (seconds or s) illustrating the dynamic performance of the bolometer according to various embodiments when the input infrared light is 1 milli-watt (mW). The dynamic performance is calculated by commercial software (Coventorware). When a 1-mW Mid-IR beam is injected into the bolometer, the ring resonator may be effectively heated from about 305° C. to about 340° C. within about 10 ms.

Figure 8B:
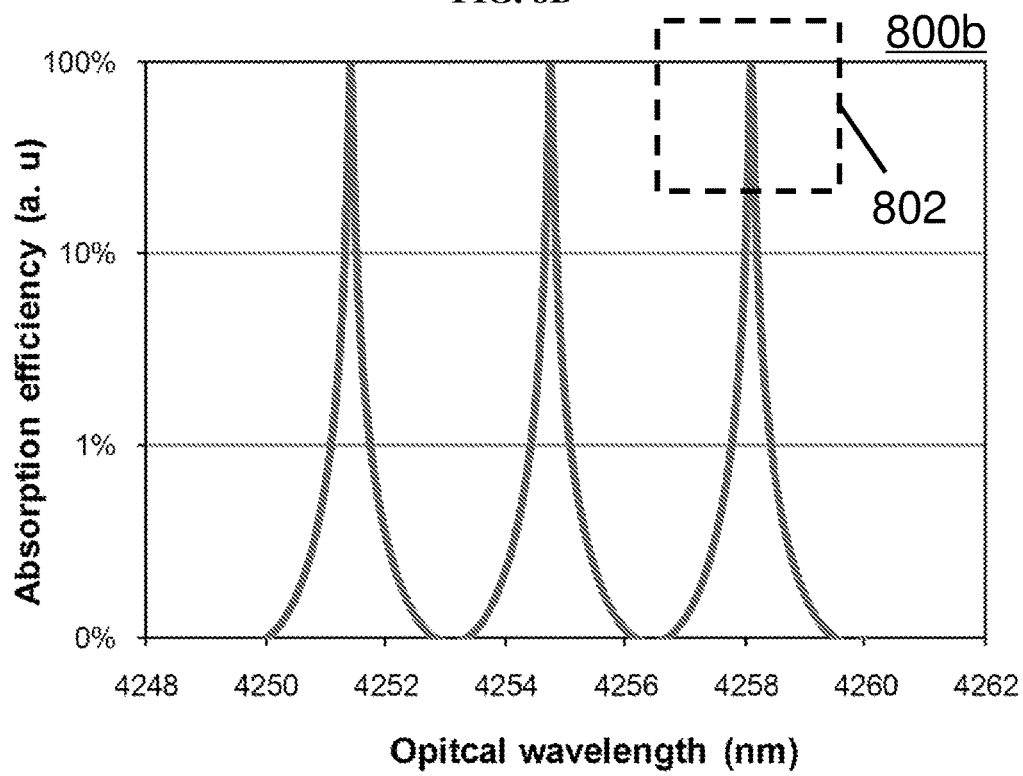
FIG. 8B is a plot of absorption efficiency (arbitrary units or a.u.) as a function of optical wavelength (nanometers or nm) illustrating cavity enhanced absorption efficiency of the bolometer according to various embodiments.
Figure 8C:
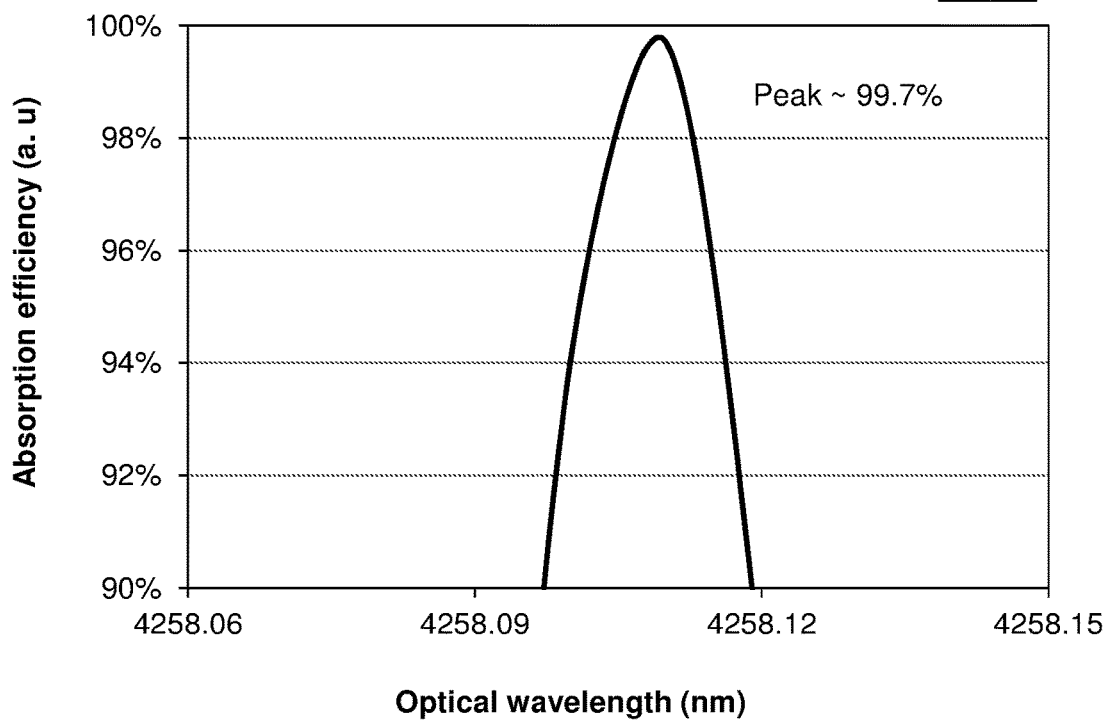
FIG. 8C is a plot of absorption efficiency (arbitrary units or a.u.) as a function of optical wavelength (nanometers or nm) showing a magnified portion of a peak shown in FIG. 8B.

FIG. 8B is a plot 800b of absorption efficiency (arbitrary units or a.u.) as a function of optical wavelength (nanometers or nm) illustrating cavity enhanced absorption efficiency of the bolometer according to various embodiments. FIG. 8C is a plot 800c of absorption efficiency (arbitrary units or a.u.) as a function of optical wavelength (nanometers or nm) showing a magnified portion of a peak shown in FIG. 8B (indicated by 802).

FIGS. 8B and 8C show that the mid-IR absorption efficiency may be ideally very close to 100%, i.e. about 99.7%. The absorption efficiency may be much higher than traditional bolometric transducers, which may not have cavity enhancement interaction.

Figure 8D:
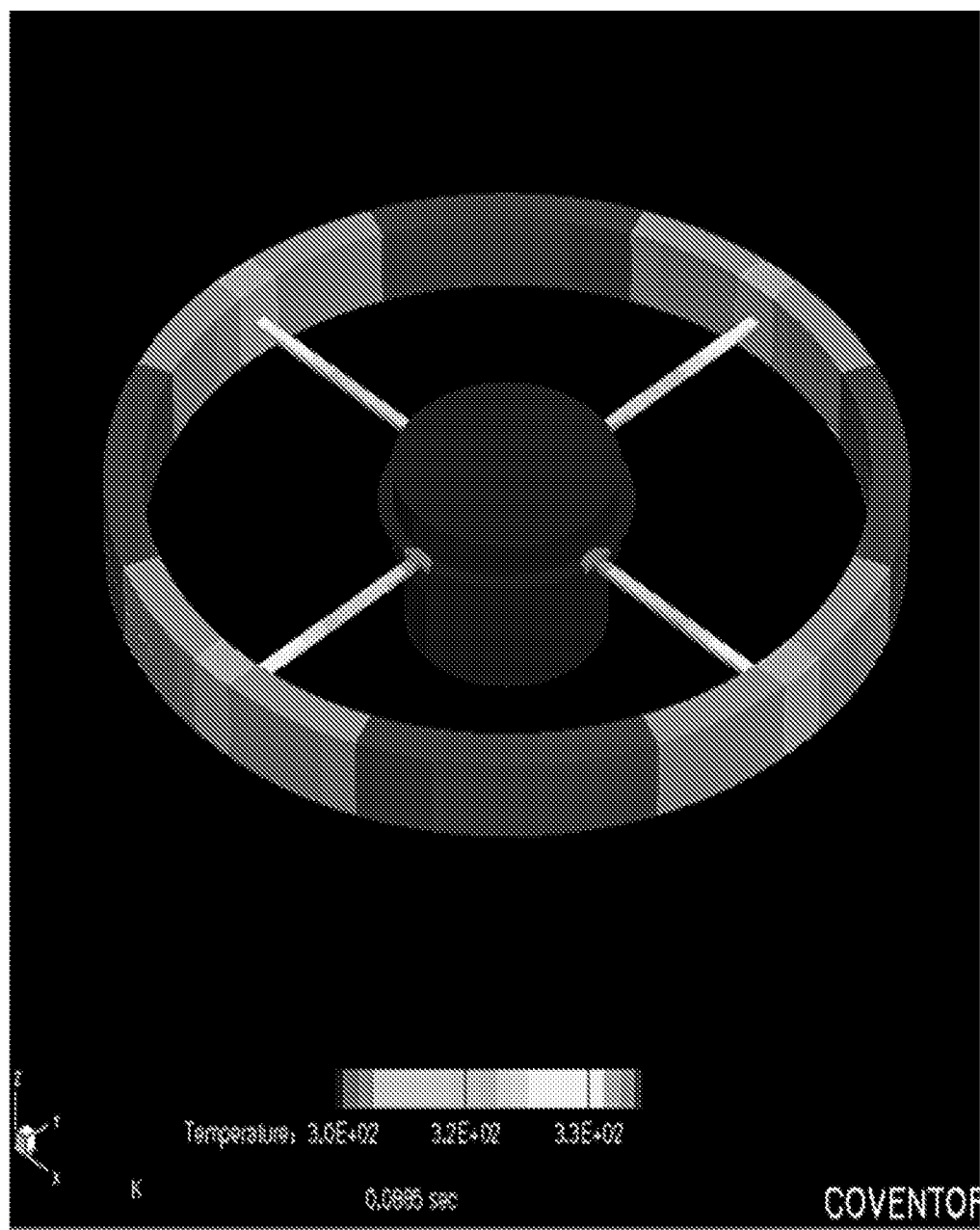
FIG. 8D is an image showing the temperature distribution of a bolometer according to various embodiments in operation.

FIG. 8D is an image 800d showing the temperature distribution of a bolometer according to various embodiments in operation.

Figure 9:
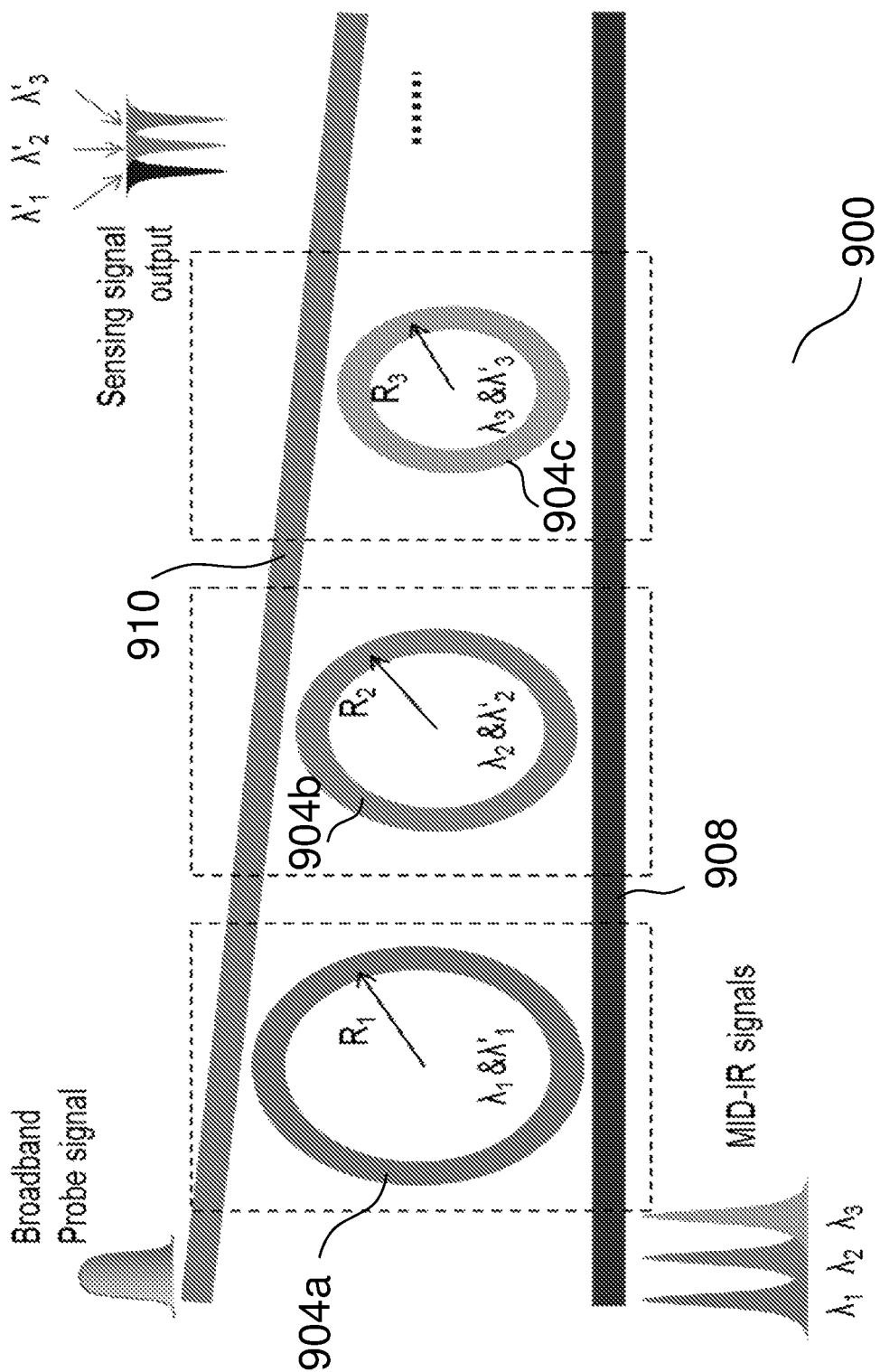
FIG. 9 is a schematic illustrating a bolometer according to various embodiments.

FIG. 9 is a schematic illustrating a bolometer 900 according to various embodiments. The bolometer 900 may include a first ring resonator structure 904a, a second ring resonator structure 904b, and a third ring resonator structure 904c over a substrate. The ring resonator structures 904a-c may be of different radiuses. The first ring resonator 904a may have a radius $R_1$, the second ring resonator 904b may have a radius $R_2$ (smaller than $R_1$), and the third ring resonator 904c may have a radius $R_3$ (smaller than $R_2$).

The bolometer 900 may further include a first waveguide 908 configured to couple infrared light to the ring resonator structures 904a-c. The bolometer 900 may further include a second waveguide 910 configured to couple a probe light input to the ring resonator structures 904a-c.

The infrared light may include a plurality of wavelengths $\lambda_1$, $\lambda_2$ and $\lambda_3$. Further, the probe light input may be a broadband signal including a plurality of wavelengths. Different ring resonators 904a-c may be configured to detect or sense the different wavelengths of infrared light. In other words, different ring resonators 904a-c may be configured to respond to different wavelengths, i.e. the different ring resonators 904a-c may have different resonant wavelengths. For instance, ring resonator 904a may be configured to respond to only $\lambda_1$, ring resonator 904b may be configured to respond to only $\lambda_2$, and ring resonator 904c may be configured to respond to only $\lambda_3$, $\lambda_1$ may be of a smaller wavelength compared to $\lambda_2$, while $\lambda_2$ may be of a smaller wavelength compared to $\lambda_3$.

The probe light output of ring resonator 904a may be provided by $\lambda_1'$, the probe light output of ring resonator 904b may be provided by $\lambda_2'$, and the probe light output of ring resonator 904c may be provided by $\lambda_3'$, $\lambda_1'$ may be of a smaller wavelength compared to $\lambda_2'$, while $\lambda_2'$ may be of a smaller wavelength compared to $\lambda_3'$.

Various embodiments may be suitable for identifying multiple wavelengths of infra-red light. Various embodiments may be suitable for and/or effective in gas composition analysis.

FIGS. 10A-G illustrate a method for fabricating a bolometer 1000 in which the silicon oxide layer 1006 is provided on top of the ring resonator structure 1004 according to various embodiments.

Figure 10A:
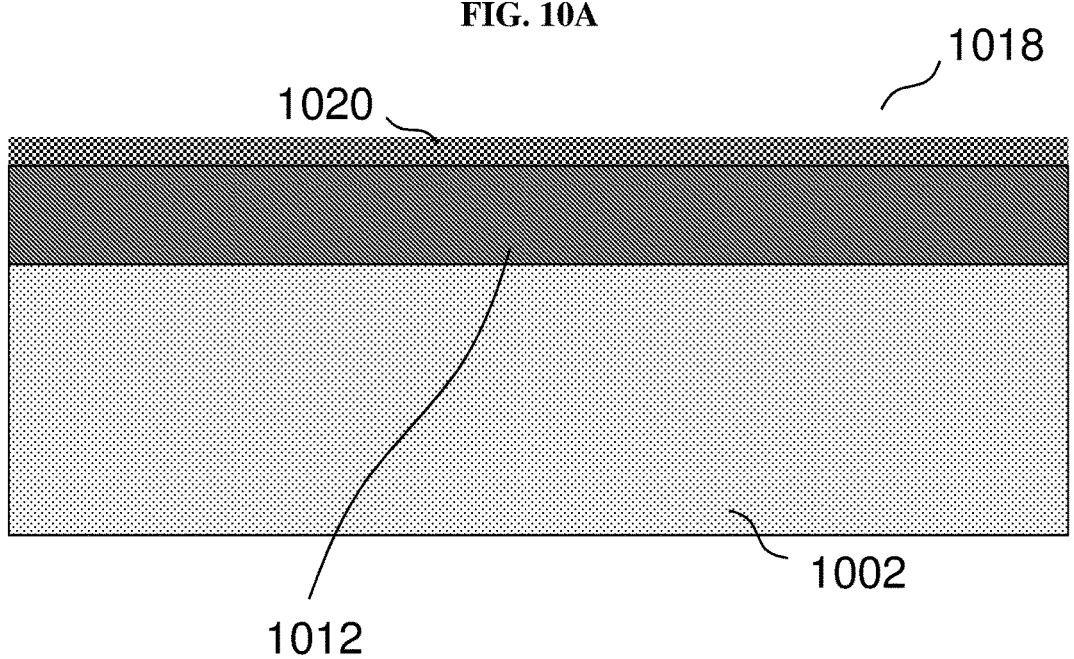
FIG. 10A shows an silicon-in-insulator wafer including a silicon substrate, a silicon nitride ($Si_3N_4$) layer on the silicon substrate, and a silicon layer on the silicon nitride layer according to various embodiments.

FIG. 10A shows an silicon-on-insulator (SOI) wafer 1018 including a silicon substrate 1002, a silicon nitride ($Si_3N_4$) layer 1012 on the silicon substrate, and a silicon layer 1020 on the silicon nitride layer 1012 according to various embodiments.

Figure 10B:
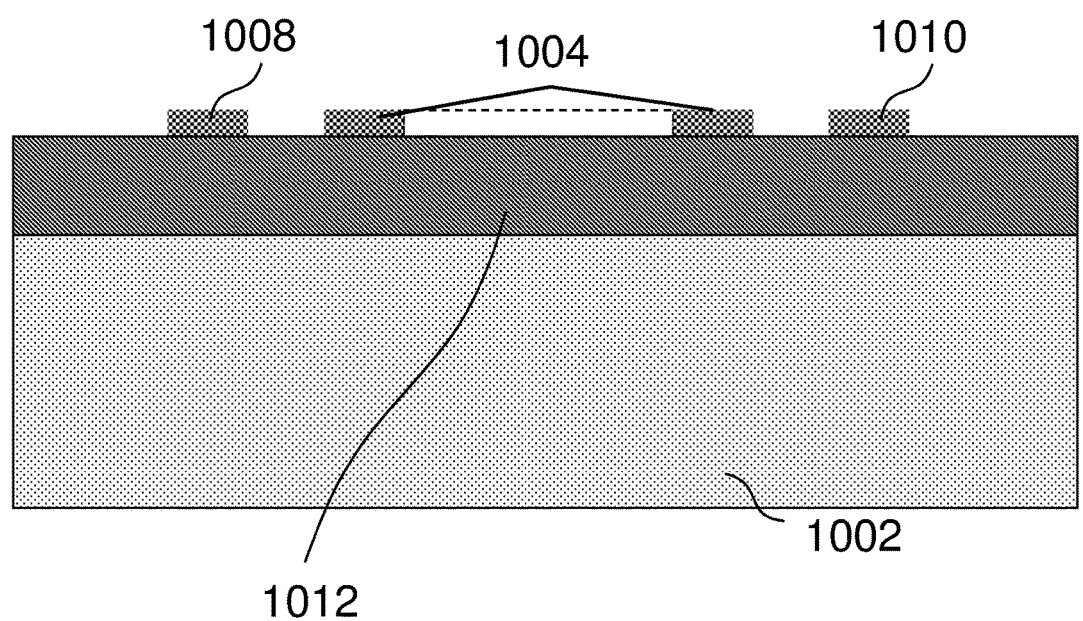
FIG. 10B shows the portions of the silicon layer being etched to form the ring resonator structure, a first waveguide, and a second waveguide according to various embodiments.

FIG. 10B shows the portions of the silicon layer 1020 being etched to form the ring resonator structure 1004, a first waveguide 1008, and a second waveguide 1010 according to various embodiments.

Figure 10C:
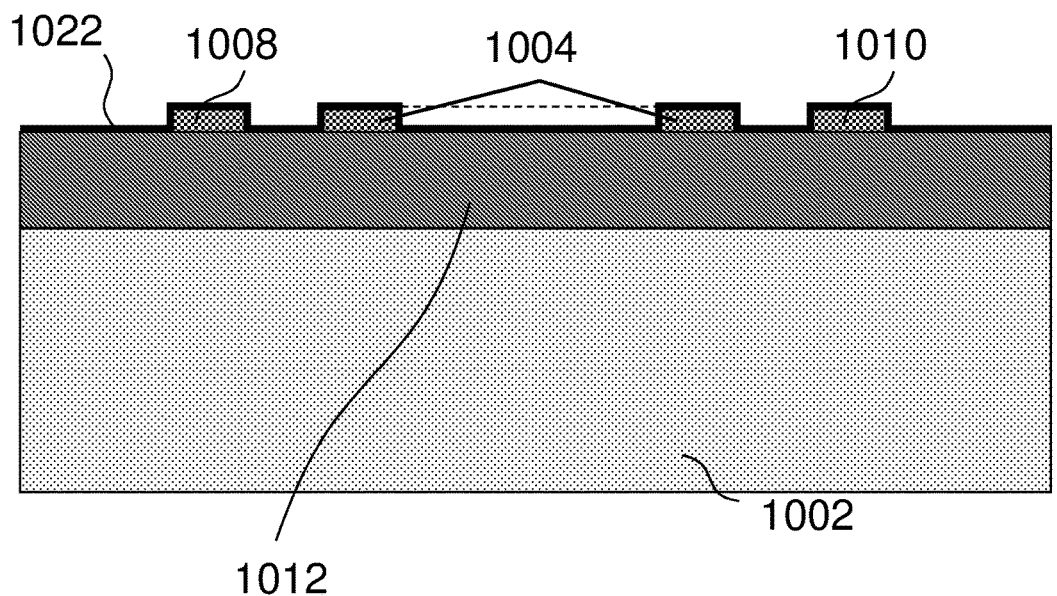
FIG. 10C shows a protection layer being formed over the ring resonator structure, the first waveguide, and the second waveguide according to various embodiments.

FIG. 10C shows a protection layer 1022 being formed over the ring resonator structure 1004, the first waveguide 1008, and the second waveguide 1010 according to various embodiments. The protection layer 1022 may include or may be aluminum oxide ($Al_2O_3$).

Figure 10D:
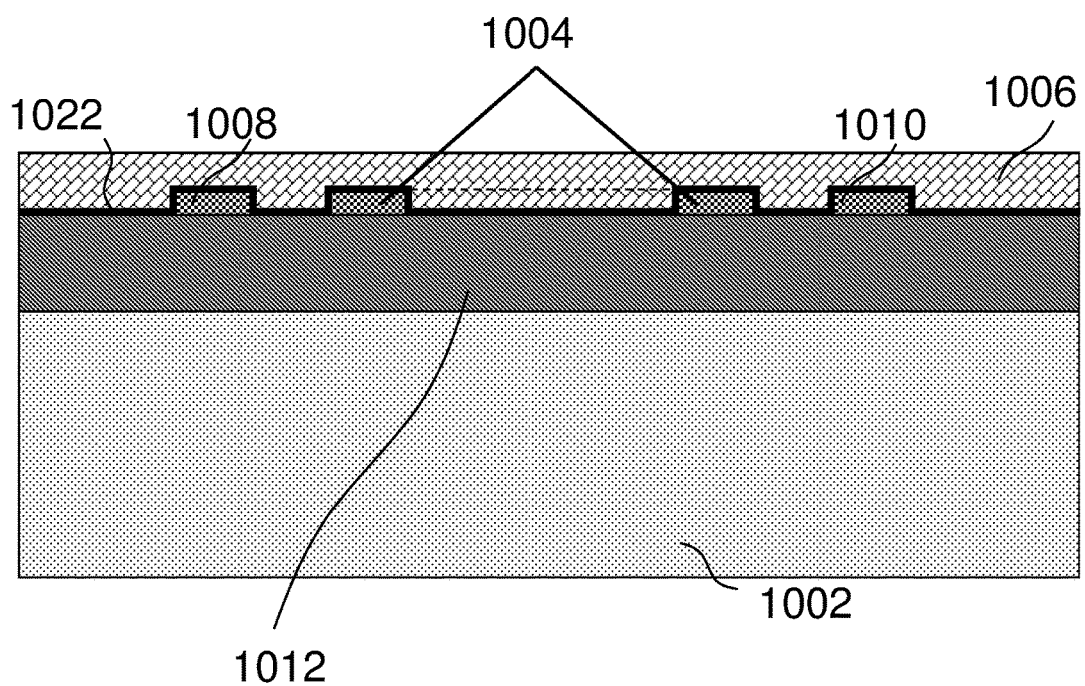
FIG. 10D shows a silicon oxide layer being deposited on the protection layer according to various embodiments.

FIG. 10D shows a silicon oxide layer 1006 being deposited on the protection layer 1022 according to various embodiments. The layer 1006 as deposited may extend over an entire surface of the substrate 1002.

Figure 10E:
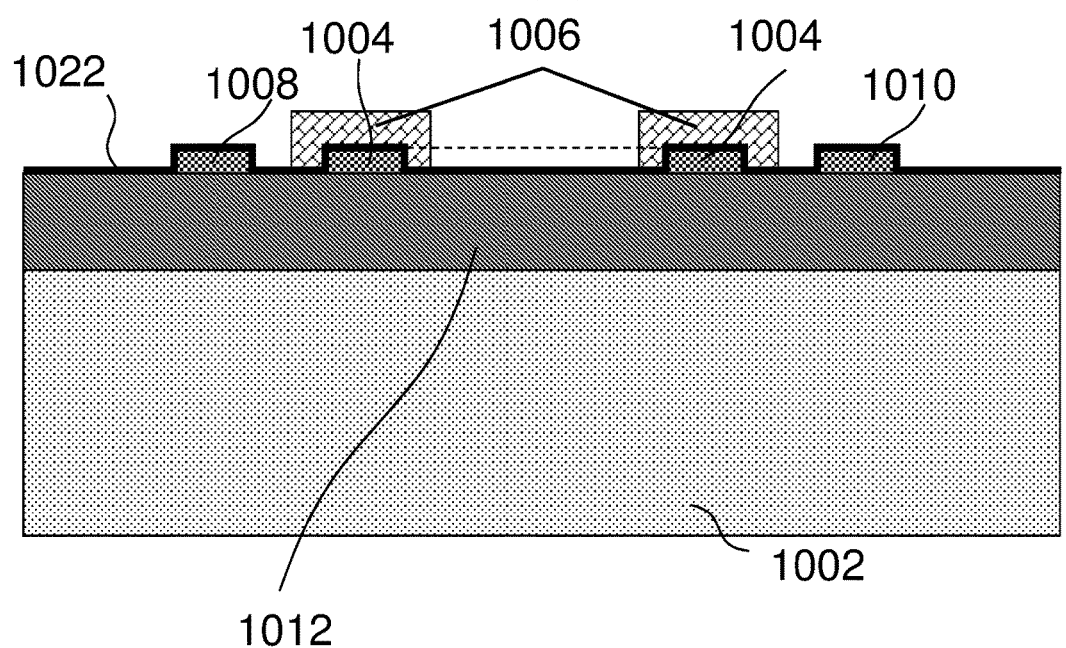
FIG. 10E shows the silicon oxide layer being etched so that portions of the silicon oxide layer over the first waveguide and the second waveguide are removed according to various embodiments.

FIG. 10E shows the silicon oxide layer 1006 being etched so that portions of the silicon oxide layer 1006 over the first waveguide 1008 and the second waveguide 1010 are removed according to various embodiments. Portions of the silicon oxide layer 1006 over the ring resonator 1004 may not be removed. The silicon oxide layers 1006 may be in thermal contact with the ring resonator structure 1004. During operation, heat may flow from the ring resonator structure 1004 through the protection layer 1022 to the silicon oxide layers 1006. The protective layer 1022 may be of sufficient conductivity to effectively transmit heat from the ring resonator structure 1004 to the silicon oxide layer 1006.

Figure 10F:
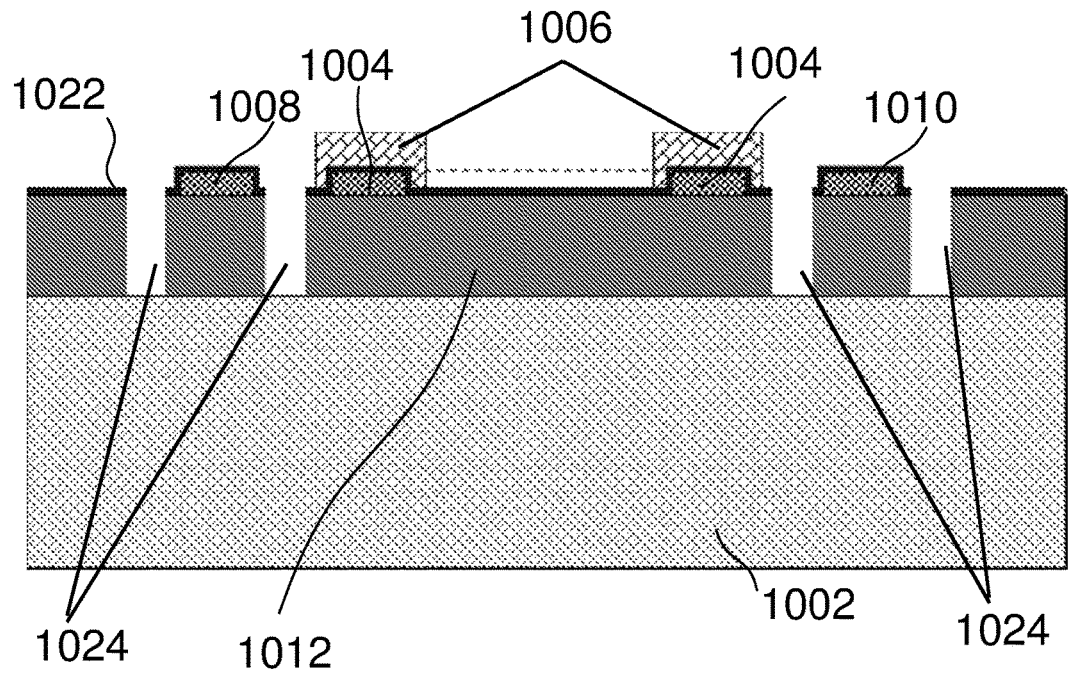
FIG. 10F shows trenches being formed according to various embodiments.

FIG. 10F shows trenches 1024 being formed according to various embodiments. Portions of the protection layer 1022 on both sides of the first waveguide 1008 and on both sides of the second waveguide 1010, followed by the underlying silicon nitride layer 1012 may be etched anisotropically to form the trenches 1024.

Figure 10G:
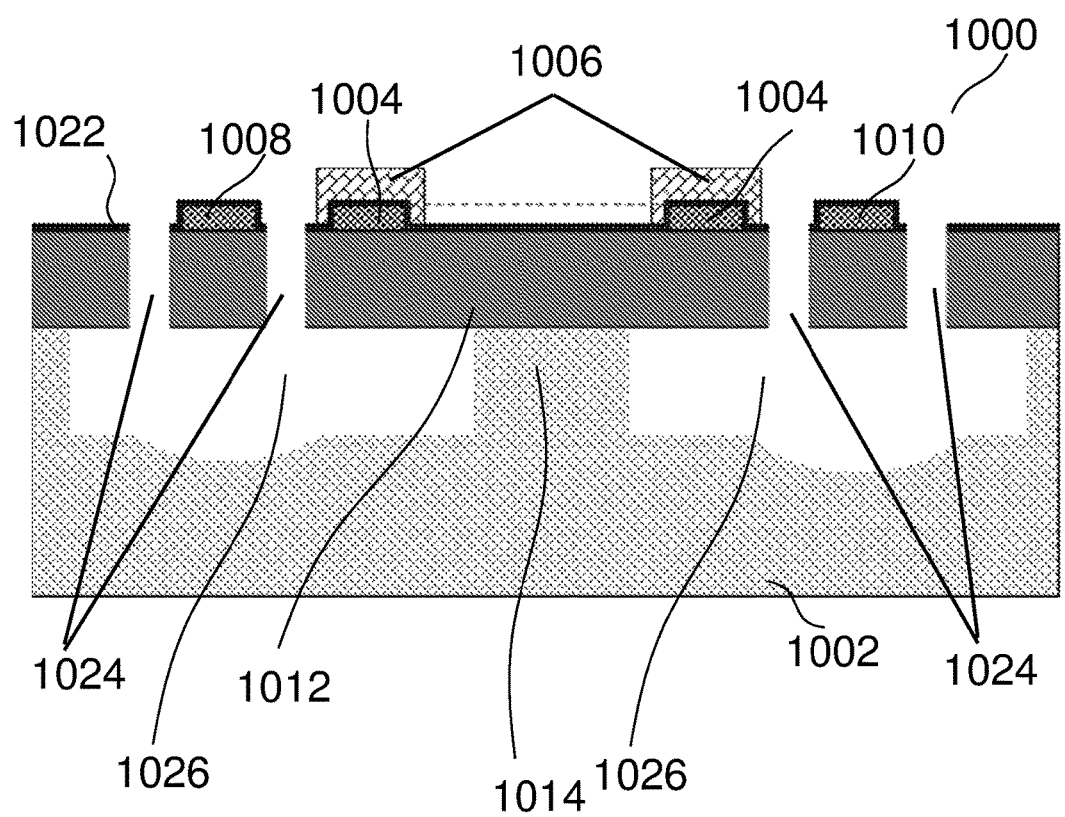
FIG. 10G shows the formation of cavities to fabricate the bolometer according to various embodiments.

FIG. 10G shows the formation of cavities 1026 to fabricate the bolometer 1000 according to various embodiments. The cavities 1026 may be formed under the ring resonator 1004. The cavities 1026 may further extend to under the first waveguide 1008, and under the second waveguide 1010. The silicon substrate 1002 may be etched by a suitable isotropic etchant, such as xenon difluoride ($XeF_2$). The isotropic etchant may be introduced to the substrate 1002 through trenches 1024. The silicon substrate 1002 may be etched to form a pedestal 1014 for holding the ring resonator 1004. The silicon nitride layer 1012 may be resistant to the isotropic etchant.

The pedestal 1014 may extend substantially perpendicular to a main surface of the substrate 1002. The pedestal 1014 may support a portion of the silicon nitride layer 1012. The ring resonator structure 1004 may be on the portion of the silicon nitride layer 1012. The first waveguide 1008 may be on another portion of the silicon nitride layer 1012. The other portion of the silicon nitride layer 1012 may be over one of the cavities 1026. Similarly, the second waveguide 1010 may be on a further portion of the silicon nitride layer 1012. The further portion of the silicon nitride layer 1012 may be over another one of the cavities 1026.

A gap formed by one of the trenches 1024 may be between the first waveguide 1008 and the ring resonator structure 1004. Another gap formed by another one of the trenches 1024 may be between the second waveguide 1010 and the ring resonator structure 1004.

FIGS. 11A-F illustrate a method for fabricating a bolometer 1100 in which the silicon oxide layer 1106 is provided below the ring resonator structure 1104 according to various embodiments.

Figure 11A:
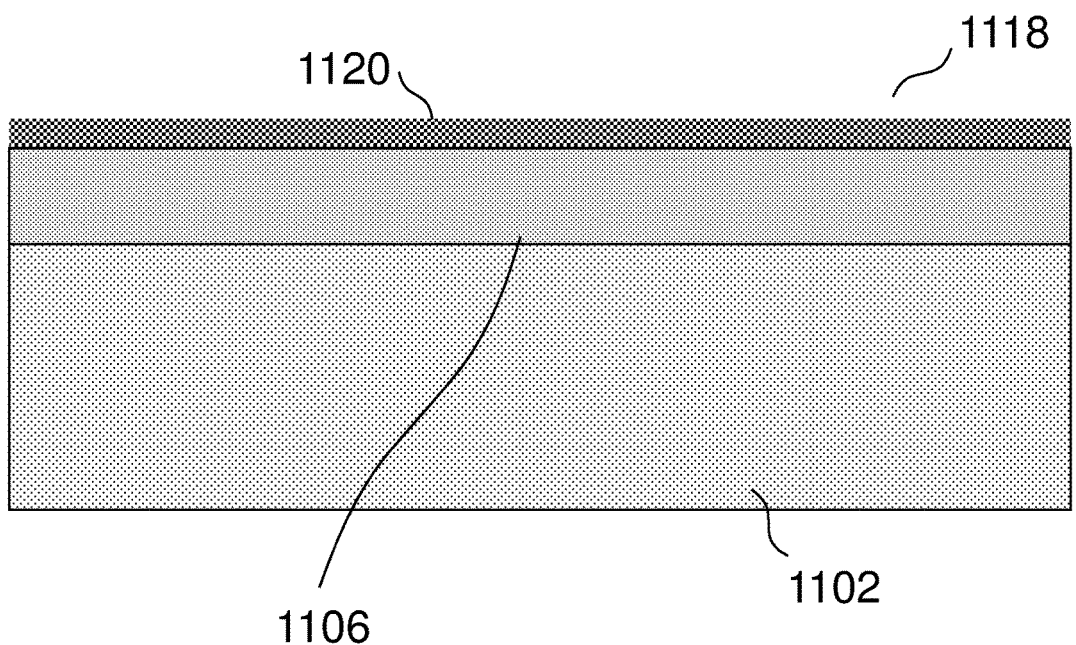
FIG. 11A shows an silicon-in-insulator wafer including a silicon substrate, a silicon oxide layer on the silicon substrate, and a silicon layer on the silicon oxide layer according to various embodiments.

FIG. 11A shows an silicon-on-insulator (SOI) wafer 1118 including a silicon substrate 1102, a silicon oxide layer 1106 on the silicon substrate 1102, and a silicon layer 1120 on the silicon oxide layer 1106 according to various embodiments.

Figure 11B:
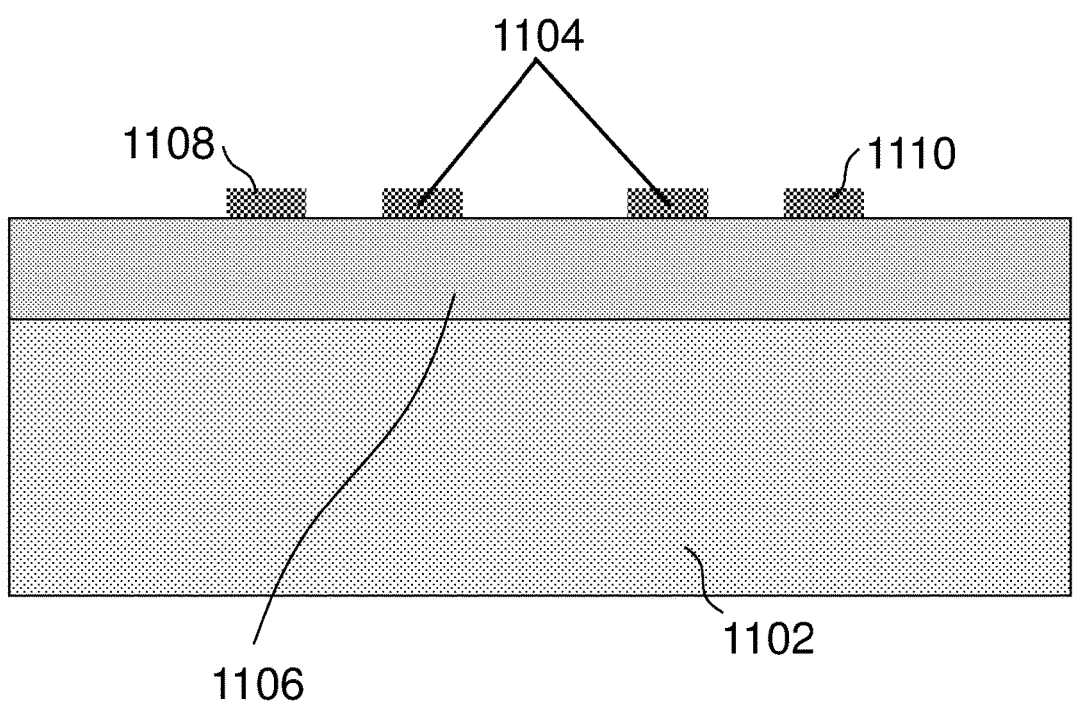
FIG. 11B shows the portions of the silicon layer being etched to form the ring resonator structure, a first waveguide, and a second waveguide according to various embodiments.

FIG. 11B shows the portions of the silicon layer 1120 being etched to form the ring resonator structure 1104, a first waveguide 1108, and a second waveguide 1110 according to various embodiments.

Figure 11C:
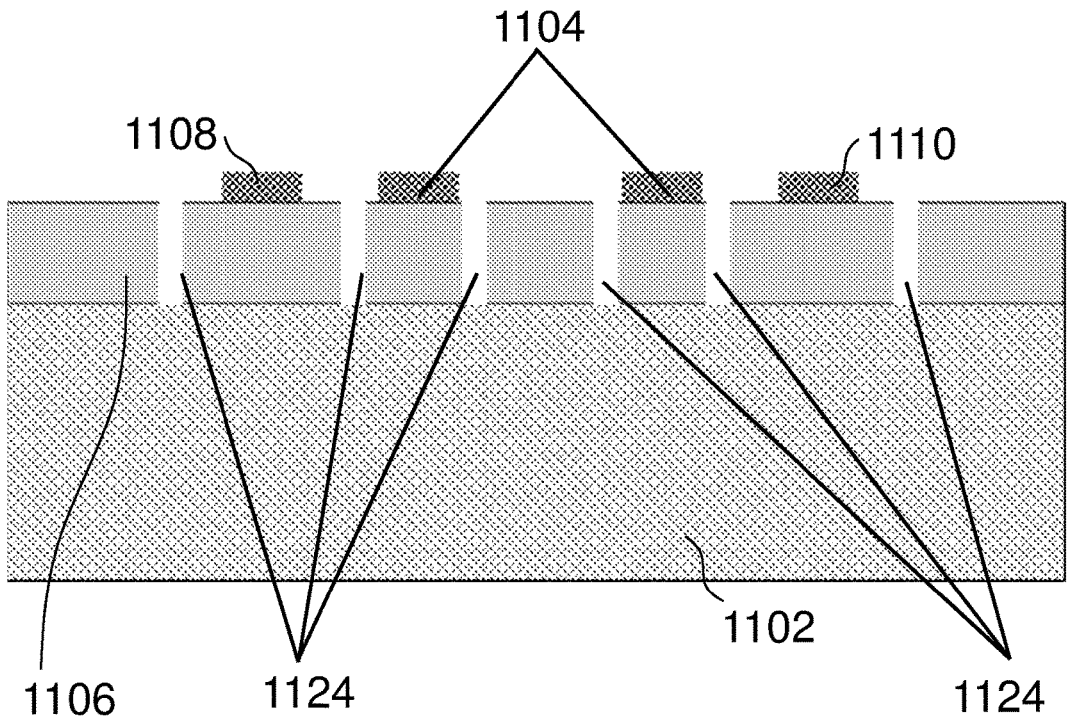
FIG. 11C shows portions of the silicon oxide layer being etched to form trenches according to various embodiments.

FIG. 11C shows portions of the silicon oxide layer 1106 being etched anisotropically to form trenches 1124 according to various embodiments. Trenches 1124 are formed on both sides of the first waveguide 1108, on both sides of the second waveguide 1110, and on both the inner circumference and the outer circumference regions of the ring resonator 1104. As shown in FIG. 11C, the trench 1124 on the outer circumference region of the ring resonator 1104 may coincide with a trench 1124 on one side of the first waveguide 1108, and a trench 1124 on one side of the second waveguide 1110.

Figure 11D:
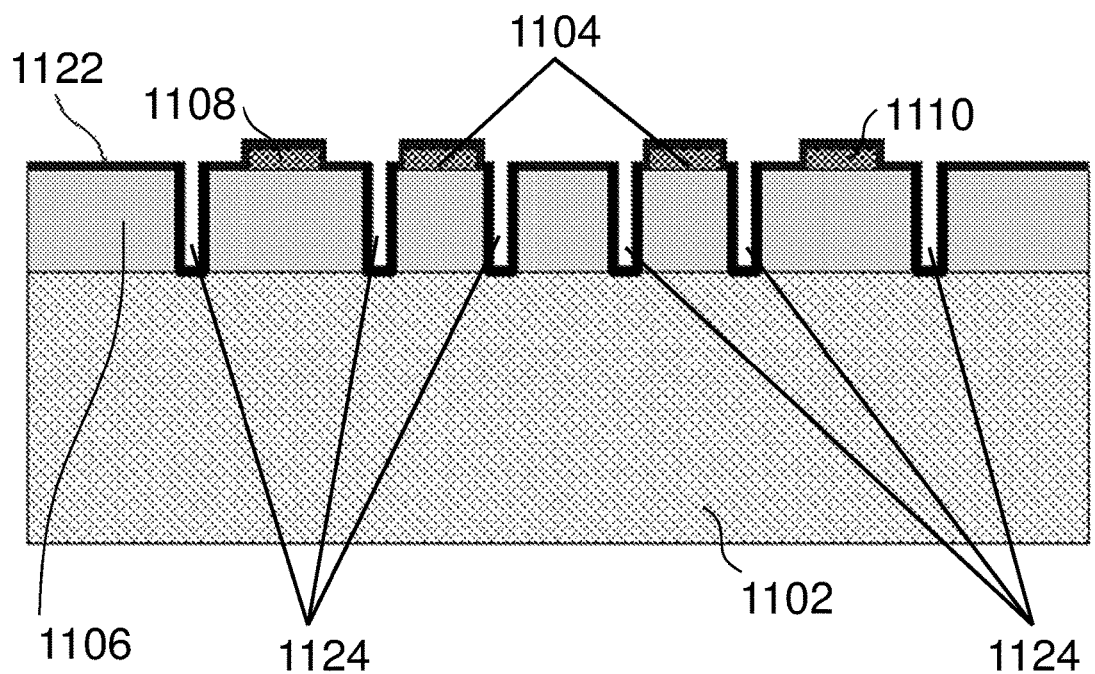
FIG. 11D shows a suspension layer being formed over the ring resonator structure, the first waveguide, and the second waveguide according to various embodiments.

FIG. 11D shows a suspension layer 1122 being formed over the ring resonator structure 1104, the first waveguide 1108, and the second waveguide 1110 according to various embodiments. The suspension layer 1122 may include aluminum oxide ($Al_2O_3$) or silicon nitride ($Si_3N_4$). The suspension layer 1108 may further extend over the silicon oxide layer 1106. The bottom and sidewalls of trenches 1124 may also be covered by the suspension layer 1122.

Figure 11E:
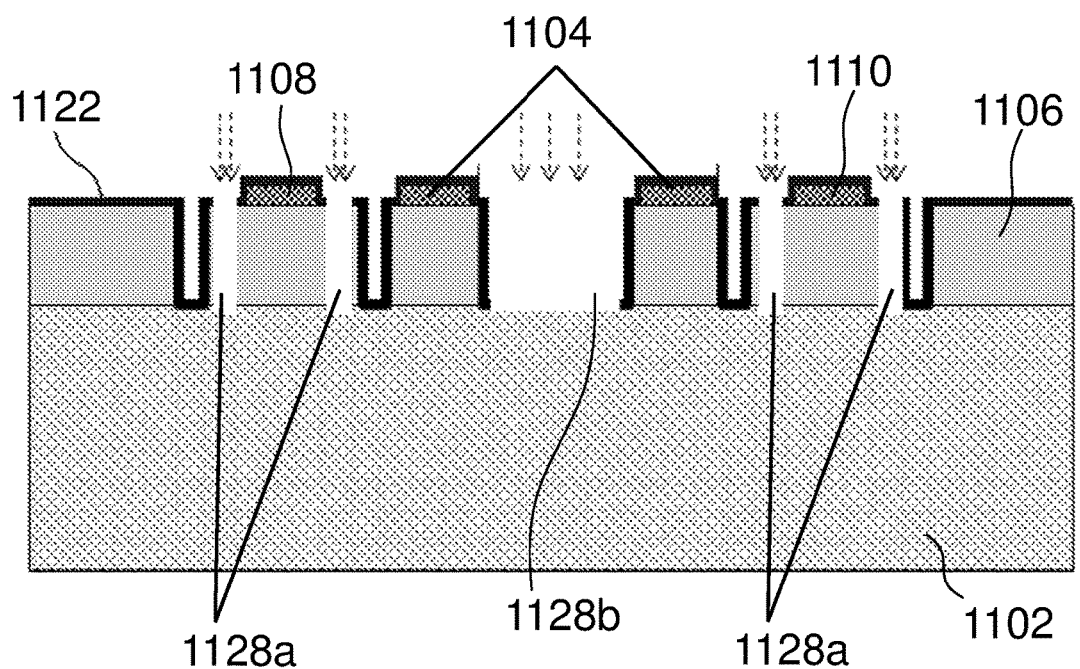
FIG. 11E shows portions of the suspension layer being etched according to various embodiments.

FIG. 11E shows portions of the suspension layer 1122 being etched according to various embodiments. Portions of the silicon oxide layer 1106 under the etched portions of the suspension may also being etched. The portions of the suspension layer 1122 (and the underlying silicon oxide layer 1106) being etched may be on both sides of the first waveguide 1108, and on both side of the second waveguides 1110. The portions of the suspension layer 1122 (and the underlying silicon oxide layer 1106) may be etched anisotropically to form further trenches 1128a and central groove 1128b. The further trenches 1128a may be nearer to the first waveguide 1108 or the second waveguide 1110 compared to the respective trenches 1124 that have been formed on the sides of the first waveguide 1108 or the second waveguide 1110. The central groove 1128b may be formed on the portion of the suspension layer 1122 and the underlying silicon oxide layer 1106 at the center of the ring resonator 1104.

Figure 11F:
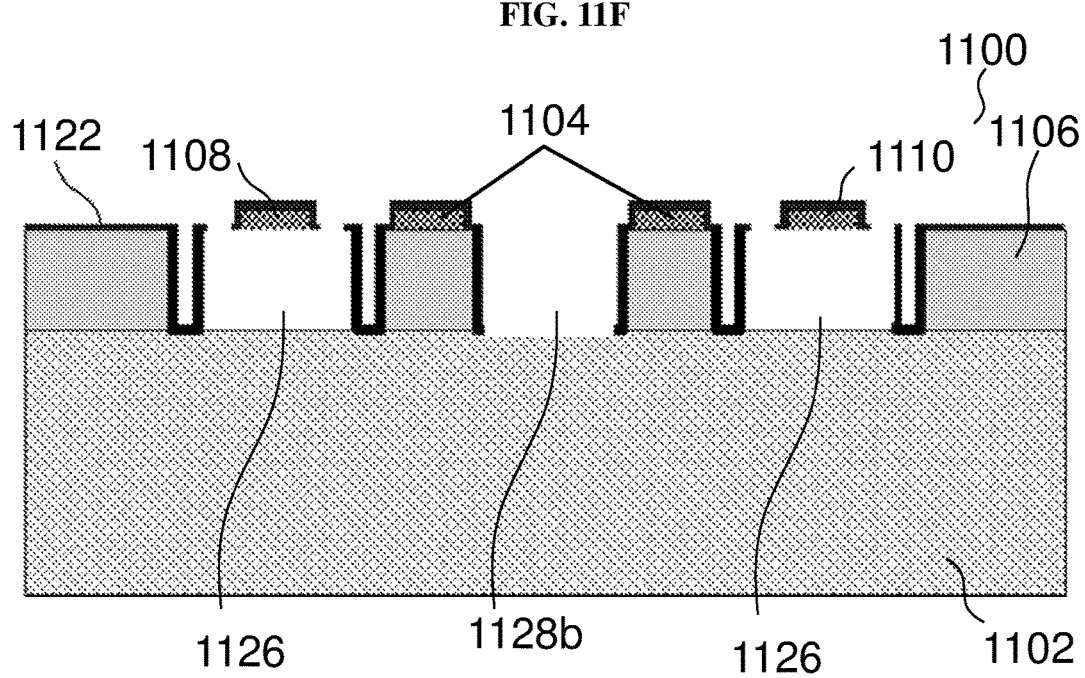
FIG. 11F shows the formation of cavities to fabricate the bolometer according to various embodiments.

FIG. 11F shows the formation of cavities 1126 to fabricate the bolometer 1100 according to various embodiments. Portions of the silicon oxide layer 1106 under the first waveguide 1108 and the second waveguide 1110 may be isotropically etched to form cavities 1126. The bolometer 110 may include the first waveguide 1108 and the second waveguide 1110 suspended over cavities 1126.

The bolometer 1100 may include the ring resonator structure 1104 on a portion of the silicon oxide layer 1106. The portion of the silicon oxide layer 1106 may be on the substrate 1102. The first waveguide 1108 may be suspended over one of the cavities 1126 by suspension layer 1122. The second waveguide 1110 may be suspended over another one of the cavities 1126 by suspension layer 1122. The first waveguide 1108 may be separated from the ring resonator structure 1104 by a gap formed by one of the trenches 1126 and one of the further trenches 1128a. The second waveguide 1110 may be separated from the ring resonator structure 1104 by another gap formed by another one of the trenches 1126 and another one of the further trenches 1128a.

Various embodiments may provide a bolometric transducer to overcome the limitations of low sensitivity and slow response time in conventional designs. Various embodiments may be integrated with other photonics optical sensors, such as photonics gas sensor, to detect the guided mid-infrared (mid-IR) optical wave.

Various embodiments may relate to a high finesse cavity enhanced mid-IR detector with ultra-high absorption efficiency (up to 99.7%). Various embodiments may possess an ultra-compact chip size. Various embodiments may have wavelength selectivity capability for high resolution sensing applications. Various embodiments may include an array of ring resonators for detecting multiple mid-IR lights. Various embodiments may possess low power consumption.

Various embodiments may relate to a silicon nano-waveguide based mid-IR detector. Various embodiments may relate to a bolometer with nano-waveguides. Various embodiments may offer more flexibility of both guided light and free-space light. Various embodiments may be easily integrated with other sensors that are based on waveguide structures.

Various embodiments may relate to a swift response mid-IR detector. Various embodiments may have a small thermal capacitance and a weak thermal conductance. Various embodiments may be suitable for high-end mid-IR hazard chemical sensing applications.

Various embodiments may employ an integrated optical readout method, which may have high sensitivity and/or low power consumption. In various embodiments, the probe light input may be near infrared light. Near infrared light may have a wavelength of 1.55 µm. The near infrared light may be used to sense a middle infrared light. The middle infrared light may be important in carbon dioxide gas detection.

A photonics cavity may be designed as an optical resonance cavity, i.e. ring resonator, to trap and fully absorb a desired mid-IR light. Currently, Fabry-Perot filters and interferometric optical cavity based on metal-dielectric-metal (MDM) films are widely used as mid-IR filters to achieve wavelength selectivity. Compared with these existing approaches, various embodiments may not only achieve optical wavelength selectivity, but may also enhance IR absorption efficiency. Further, multi mid-IR lights with different wavelengths may be identified simultaneously using an array of photonics cavities, since each photonics cavity may only respond to a specific wavelength of mid-IR light.

The temperature raise due to IR absorption may be detected using highly sensitive optical approach. The optical approach may be more accurate and sensitive compared with traditional thermal IR sensors, such as thermopiles, bolometers and pyroelectric sensors, which usually suffer from large thermal and electrical noise. Moreover, the optical readout approach may be immune to the electromagnetic interference, which results in a higher sensitivity.

Various embodiments may relate to an integrated mid-IR bolometric detector based on a high finesse cavity. The mid-IR input may be enhanced through use of an optical resonator cavity and converted into heat energy with high efficiency. The temperature change induced due to mid-IR absorption may be measured by using a highly sensitive optical approach. Multi mid-IR lights with different wavelength may be identified simultaneously using an array of photonics cavities, since each photonics cavity may only respond to a wavelength of mid-IR light. Compared with traditional bulk machining technology enabled bolometric transducers, various embodiments may possess advantages in terms of: 1) integrated multi-channel detection, 2) ultra-compact size, 3) high sensitivity, 4) swift response, and/or 5) feasibility of mid-IR range light on-chip detection and integration. Potential applications may include on-chip optical gas-phase chemical sensing, inexpensive infrared imaging systems with high resolution, and/or health care related areas.

Various embodiments may relate to a dielectric waveguide structure replacement of multi-metal layer geometry. Various embodiments may relate to a bolometer with ultra-small thermal capacitance. Various embodiments may relate to a bolometer with cavity enhanced absorption efficiency. Various embodiments may relate to a bolometer with cavity enhanced absorption to replace traditional free-space radiation-absorption designs. Various embodiments may use nano-waveguide based detection to replace free space optics detection approach.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A bolometer comprising:
   a substrate;
   a ring resonator structure over the substrate;
   a silicon oxide layer in thermal contact with the ring resonator structure;
   a first waveguide over the substrate and coupled to the ring resonator structure, the first waveguide configured to couple an infrared light to the ring resonator structure so that the infrared light is trapped in the ring resonator structure and generates a temperature increase in the silicon oxide layer; and
   a second waveguide over the substrate and coupled to the ring resonator structure, the second waveguide configured to couple a probe light input to the ring resonator structure so that a probe light output is generated from the probe light input, the probe light output having a change in a characteristic from the probe light input based on the temperature increase.

2. The bolometer of claim 1,
   wherein the silicon oxide layer is provided below the ring resonator structure.

3. The bolometer of claim 1,
   wherein the silicon oxide layer is provided on top of the ring resonator structure.

4. The bolometer of claim 1, further comprising:
   a cavity below at least a portion of the ring resonator structure.

5. The bolometer of claim 1, further comprising:
   a pedestal and a plurality of spokes, configured to hold the ring resonator structure.

6. The bolometer of claim 1,
wherein the change in characteristic comprises a change in wavelength.

7. The bolometer of claim 1,
wherein the probe light comprises a wavelength of at least substantially 1.55 μm.

8. The bolometer of claim 1,
wherein the ring resonator structure is configured to change its resonant wavelength upon a temperature change.

9. The bolometer of claim 1, further comprising:
at least one further ring resonator structure, wherein the ring resonator structure and the at least one further ring resonator structure have pairwise different resonant wavelengths.

10. The bolometer of claim 1,
wherein the ring resonator structure comprises a silicon layer.

11. The bolometer of claim 1,
wherein the ring resonator structure comprises a protection layer on the silicon layer.

12. The bolometer of claim 11, wherein the protection layer comprises an $Al_2O_3$ layer.

13. A method for fabricating a bolometer, the method comprising:
providing a substrate;
providing a ring resonator structure over the substrate;
providing a silicon oxide layer in thermal contact with the ring resonator structure;
providing a first waveguide over the substrate and coupled to the ring resonator structure, to couple an infrared light to the ring resonator structure so that the infrared light is trapped in the ring resonator structure and generates a temperature increase in the silicon oxide layer; and
providing a second waveguide over the substrate and coupled to the ring resonator structure, to couple a probe light input to the ring resonator structure so that a probe light output is generated from the probe light input, the probe light output having a change in a characteristic from the probe light input based on the temperature increase.

14. The method of claim 13,
wherein providing the ring resonator structure comprises etching a silicon layer provided on the substrate.

15. The method of claim 14,
wherein providing the first waveguide comprises etching the silicon layer provided on the substrate.

16. The method of claim 14,
wherein providing the second waveguide comprises etching the silicon layer provided on the substrate.

17. The method of claim 13, further comprising:
providing a cavity below at least a portion of the ring resonator structure.

18. The method of claim 17, wherein providing the cavity comprises etching by using $XeF_2$.

19. A bolometric method comprising:
coupling an infrared light to a ring resonator structure via a first waveguide so that the infrared light is trapped in the ring resonator structure and generates a temperature increase in a silicon oxide layer in thermal contact with the ring resonator structure; and
coupling a probe light input via a second waveguide to the ring resonator structure so that a probe light output is generated from the probe light input, the probe light output having a change in a characteristic from the probe light input based on the temperature increase.

20. The bolometric method of claim 19, further comprising:
determining an energy of the infrared light based on the change in the characteristic.

* * * * *